United States Patent [19]

Takami et al.

[11] Patent Number: 5,340,670
[45] Date of Patent: Aug. 23, 1994

[54] LITHIUM SECONDARY BATTERY AND METHOD OF MANUFACTURING CARBONACEOUS MATERIAL FOR NEGATIVE ELECTRODE OF THE BATTERY

[75] Inventors: Norio Takami; Asako Satoh; Takahisa Ohsaki, all of Yokohama, Japan

[73] Assignee: Kabushiki Kaisha Toshiba, Kawasaki, Japan

[21] Appl. No.: 69,424

[22] Filed: Jun. 1, 1993

[30] Foreign Application Priority Data

| Jun. 1, 1992 | [JP] | Japan | 4-140247 |
| Sep. 30, 1992 | [JP] | Japan | 4-261418 |
| Mar. 16, 1993 | [JP] | Japan | 5-056194 |
| Mar. 18, 1993 | [JP] | Japan | 5-058565 |

[51] Int. Cl.⁵ .......................... H01M 10/40
[52] U.S. Cl. .................. 429/194; 429/197; 429/218; 423/445 R; 423/448
[58] Field of Search .............. 429/194, 197, 218; 423/445, 448

[56] References Cited

U.S. PATENT DOCUMENTS

| 4,615,959 | 10/1986 | Hayashi et al. | 429/194 |
| 4,980,250 | 12/1990 | Takahashi et al. | 429/194 |
| 5,028,500 | 7/1991 | Fong et al. | 429/194 |
| 5,079,109 | 1/1992 | Takami et al. | 429/192 |
| 5,153,082 | 10/1992 | Ogino et al. | 429/194 |
| 5,244,757 | 9/1993 | Takami et al. | 429/194 |
| 5,272,022 | 12/1993 | Takami et al. | 429/197 |

FOREIGN PATENT DOCUMENTS

| 0346088 | 12/1989 | European Pat. Off. |
| 0409192 | 1/1991 | European Pat. Off. |
| 0474183 | 3/1992 | European Pat. Off. |
| 2-82466 | 3/1990 | Japan |
| 4-61747 | 2/1992 | Japan |
| 4-115457 | 4/1992 | Japan |
| 4-115458 | 4/1992 | Japan |
| 4-184862 | 7/1992 | Japan |
| 2247771 | 3/1992 | United Kingdom |

*Primary Examiner*—Prince Willis, Jr.
*Assistant Examiner*—M. Nuzzolillo
*Attorney, Agent, or Firm*—Finnegan, Henderson, Farabow, Garrett & Dunner

[57] ABSTRACT

A lithium secondary battery having a high capacity and excellent in charge-discharge efficiency, cycle life, flatness of a discharge voltage, and rapid charge-discharge cycle characteristics is disclosed. This lithium secondary battery includes a positive electrode housed in a case, a negative electrode housed in the case and containing a carbonaceous material which has an exothermic peak at 700° C. or more when measured by a differential thermal analysis and an intensity ratio $P_{101}/P_{100}$ of a (101) diffraction peak $P_{101}$ to a (100) diffraction peak P100 of a graphite structure, obtained by X-ray diffraction analysis, of 0.7 to 2.2 and absorbs and desorbs lithium ions, a separator housed in the case so as to be arranged between the positive and negative electrodes, and a nonaqueous electrolyte contained in the case.

30 Claims, 6 Drawing Sheets

LITHIUM SECONDARY BATTERY AND METHOD OF MANUFACTURING CARBONACEOUS MATERIAL FOR NEGATIVE ELECTRODE OF THE BATTERY

BACKGROUND OF THE INVENTION

1. Field of the Invention

The present invention relates to a lithium secondary battery and, more particularly, to a lithium secondary battery which exhibits excellent battery characteristics by improving the constitution of a negative electrode. The present invention also relates to a method of manufacturing a negative electrode carbonaceous material suitable for a lithium secondary battery.

2. Description of the Related Art

Recently, nonaqueous electrolyte batteries using lithium as their negative electrode active materials have attracted attention as high-energy-density batteries. As an example, primary batteries using, e.g., manganese dioxide ($MnO_2$), carbon fluoride [$(CF_2)n$], and thionyl chloride ($SOCl_2$), as their positive electrode materials, are widely used as power sources of calculators and watches and backup batteries of memories.

In addition, with recent reduction in size and weight of various electronic devices, such as VTRs and communication devices, a demand has increasingly arisen for high-energy-density secondary batteries as power sources of these devices. To meet this demand, active researches have been made on lithium secondary batteries using lithium as a negative electrode material.

These researches have been made on a lithium secondary battery comprising a negative electrode consisting of lithium; a nonaqueous electrolyte, in which a lithium salt, such as $LiClO_4$, $LiBF_4$, or $LiAsF_6$, is dissolved in a nonaqueous solvent, such as propylene carbonate (PC), 1,2-dimethoxyethane (DME), $\gamma$-butyrolactone ($\gamma$-BL), or tetrahydrofuran (THF), or a lithium-ion-conductive solid electrolytic salt; and a positive electrode containing an active material mainly consisting of a compound which topochemically reacts with lithium, such as $TiS_2$, $MoS_2$, $V_2O_5$, $V_6O_{13}$, and $MnO_2$.

No lithium secondary battery with the above arrangement, however, has been put into practical use. This is so mainly because the charge-discharge efficiency is low and the number of times by which charge and discharge are possible is small (i.e., the cycle life is short). It is considered that the major cause for this is degradation in lithium due to the reaction between lithium of the negative electrode and the nonaqueous electrolyte. That is, the surface of lithium which is dissolved as lithium ions in the nonaqueous electrolyte during discharge is partially inactivated by reacting with the nonaqueous solvent contained in the electrolyte when it precipitates from the nonaqueous electrolyte during charge. As a result, when charge and discharge are repeatedly performed, lithium precipitates into dendrites or globules or leaves a collector of the negative electrode.

For these reasons, lithium secondary batteries having negative electrodes containing carbonaceous materials which absorb and desorb lithium ions, such as coke, a resin sintered product, a carbon fiber, and pyrolytic carbon, have been proposed. A lithium secondary battery having a negative electrode of this type can reduce degradation in negative electrode characteristics by suppressing the reaction between lithium and the nonaqueous electrolyte and hence the precipitation of dendrites.

It is considered that in the negative electrode containing the above carbonaceous material, absorption and desorption of lithium ions occur in a portion of a structure (graphite structure) in which hexagonal-net-plane layers consisting primarily of carbon atoms are stacked, particularly in portions between these hexagonal-net-plane layers, thereby causing charge and discharge. It is, therefore, required to use a carbonaceous material, in which a graphite structure is developed to some extent, as the negative electrode of a lithium secondary battery. However, the negative electrode containing the carbonaceous material obtained by powdering giant crystals that are highly graphitized decomposes the nonaqueous electrolyte, decreasing the capacity and the charge-discharge efficiency of a battery. Especially when a lithium secondary battery having the above negative electrode is operated at a high current density, the capacity, and the voltage during charge-discharge of the battery decrease significantly because of the diffusion limitation caused by the slow diffusion rate of lithium ions. In addition, the crystal structure or the fine structure of the carbonaceous material collapses as the charge-discharge cycle progresses. This impairs the ability of the material to absorb and desorb lithium ions, resulting in a short cycle life.

Furthermore, like the negative electrode containing the carbonaceous material obtained by powdering giant crystals such as natural graphite, a negative electrode containing a fine powder of carbon fibers which are highly graphitized decomposes the nonaqueous electrolyte, with the result that the performance as the negative electrode is largely degraded.

A carbonaceous material consisting of coke or carbon fibers with a low graphitization degree, on the other hand, can suppress decomposition of the solvent to some extent. A negative electrode containing a carbonaceous material of this type, however, has problems of a low capacity, a low charge-discharge efficiency, a high overvoltage during charge and discharge, a low flatness of the discharge voltage of a battery, and a short cycle life.

Published Unexamined Japanese Patent Application Nos. 62-268058, 2-82466, 4-61747, 4-115458, 4-184862, and 4-190557 disclose various carbonaceous materials which obtain optimal parameters of the graphite structure by controlling the degree of graphitization. However, negative electrodes containing these carbonaceous materials do not necessarily have sufficiently good characteristics.

SUMMARY OF THE INVENTION

It is an object of the present invention to provide a lithium secondary battery having a high capacity and excellent in charge-discharge efficiency, cycle life, flatness of a discharge voltage, and rapid charge-discharge cycle performance.

It is another object of the present invention to provide a method of manufacturing a negative electrode carbonaceous material suitable for the above lithium secondary battery having superior characteristics.

According to one aspect of the present invention, there is provided a lithium secondary battery comprising:

a positive electrode housed in a case;

a negative electrode housed in the case and containing a carbonaceous material which has an exothermic peak at 700° C. or more when measured by a differential thermal analysis, and an intensity ratio $P_{101}/P_{100}$ of a (101) diffraction peak $P_{101}$ to a (100) diffraction peak $P_{100}$ of a graphite structure, obtained by X-ray diffraction analysis, of 0.7 to 2.2, and absorbs and desorbs lithium ions;

a separator housed in the case so as to be arranged between the positive and negative electrodes; and a nonaqueous electrolyte contained in the case.

According to another aspect of the present invention, there is provided a lithium secondary battery comprising:

a positive electrode housed in a case;

a negative electrode housed in the case and containing a carbonaceous material which has an exothermic peak at 700° C. or more when measured by a differential thermal analysis, a mean length La of a crystallite in an a-axis direction of a graphite structure, which is derived from a diffraction peak of a (110) plane obtained by X-ray diffraction analysis, of 20 to 100 nm, and a sulfur content of 1,000 ppm or less, and absorbs and desorbs lithium ions;

a separator housed in the case so as to be arranged between the positive and negative electrodes; and a nonaqueous electrolyte contained in the case and consisting of a solvent mixture containing ethylene carbonate and at least one type of a nonaqueous solvent, which has a melting point lower than the melting point of ethylene carbonate and a donor number of 18 or less, and a lithium salt dissolved in the solvent mixture.

According to still another aspect of the present invention, there is provided a lithium secondary battery comprising:

a positive electrode housed in a case;

a negative electrode housed in the case and containing a carbonaceous material which has an exothermic peak at 700° C. or more when measured by a differential thermal analysis, a content of each metal element of 0 to 50 ppm, a silicon content of 0 to 50 ppm, a nitrogen content of 0 to 1,000 ppm, and a sulfur content of 0 to 1,000 ppm, and absorbs and desorbs lithium ions;

a separator housed in the case so as to be arranged between the positive and negative electrodes; and a nonaqueous electrolyte contained in the case.

According to still another aspect of the present invention, there is provided a lithium secondary battery comprising:

a positive electrode housed in a case, and containing, as an active material, a lithium metal compound which includes at least one metal selected from the group consisting of cobalt, nickel, manganese, vanadium, titanium, molybdenum, and iron;

a negative electrode housed in the case and containing a carbonaceous material which has an interplanar distance $d_{002}$ of (002) planes of a graphite structure, obtained by X-ray diffraction analysis, of 0.340 nm or less, and absorbs and desorbs lithium ions;

a separator housed in the case so as to be arranged between the positive and negative electrodes; and a nonaqueous electrolyte contained in the case, wherein a ratio of a thickness of the positive electrode to a thickness of the negative electrode is 2:1 to 0.9:1, and a ratio of a weight per unit area of the positive electrode to a weight per unit volume of the negative electrode is 4:1 to 2:1.

According to still another aspect of the present invention, there is provided a lithium secondary battery comprising:

a positive electrode housed in a case and containing, as an active material, a lithium metal compound which includes at least one metal selected from the group consisting of cobalt, nickel, manganese, vanadium, titanium, molybdenum, and iron;

a negative electrode housed in the case and containing a carbonaceous material which has an interplanar distance $d_{002}$ of (002) planes of a graphite structure, obtained by X-ray diffraction analysis, of 0.340 nm or less, and absorbs and desorbs lithium ions;

a separator housed in the case so as to be arranged between the positive and negative electrodes; and a nonaqueous electrolyte contained in the case, wherein a bulk density of the carbonaceous material of the negative electrode is 1.35 to 1.80 $g/cm^3$.

According to still another aspect of the present invention, there is provided a method of manufacturing a carbonaceous material for a negative electrode of a battery, comprising the steps of:

carbonizing through a heat treatment at least one material selected from coke and one of fibrous and spherical carbon materials obtained from a pitch having anisotropy, thereby forming a carbon product;

pulverizing the carbon product into a carbon product powder; and graphitizing the carbon product powder through a heat treatment at 2,000° C. or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A lithium secondary battery (e.g., a cylindrical lithium secondary battery) according to the present invention will be described in detail below with reference to FIG. 1.

Figure 1:
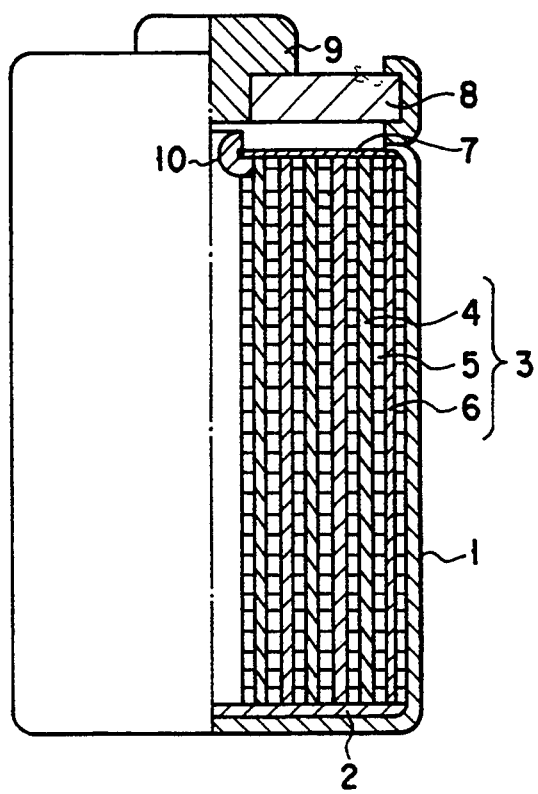
FIG. 1 is a partial sectional view showing a cylindrical lithium secondary battery according to the present invention.

Referring to FIG. 1, an insulator 2 is arranged on the bottom of a cylindrical case 1 having a bottom and consisting of, e.g., stainless steel. An electrode group 3 is housed in the case 1. The electrode group 3 has a structure in which a band-like member formed by stacking a positive electrode 4, a separator 5, and a negative electrode 6 in this order is spirally wound such that the negative electrode 6 is located outside. The separator 5 consists of, e.g., a synthetic resin nonwoven fabric, a polyethylene porous film, or a polypropylene porous film.

An electrolyte is contained in the case 1. Insulating paper 7 having an opening form in its central portion is placed above the electrode group 3 in the case 1. An insulating seal plate 8 is arranged at the upper opening portion of the case 1 and liquid-tightly fixed to the case 1 by caulking the upper opening portion inwardly. A positive electrode terminal 9 is fitted in the central portion of the insulating seal plate 8. On end of a positive electrode lead 10 is connected to the positive electrode 4, and its other end is connected to the positive electrode terminal 9. The negative electrode 6 is connected to the case 1, as a negative electrode terminal, via a negative electrode lead (not shown).

The details of the constitution of the positive electrode 4, the negative electrode 6, and the nonaqueous electrolyte will be described below.

1) Constitution of positive electrode 4

The positive electrode 4 is manufactured by, e.g., suspending an active material, a conductive agent, and a binder in an appropriate solvent, coating the resultant suspension on a collector, and drying the resultant structure into a thin plate.

The active material is preferably a metal compound which includes at least one metal selected from the group consisting of cobalt, nickel, manganese, vanadium, titanium, molybdenum, and iron, and also contains lithium. Examples of the metal compound are lithium-manganese composite oxide, lithium-containing nickel oxide, a lithium-containing cobalt compound, lithium-containing nickel-cobalt oxide, lithium-containing vanadium oxide, and a lithium-containing chalcogen compound such as lithium-containing titanium disulfide or lithium-containing molybdenum disulfide. Among these metal compounds, lithium-cobalt oxide ($LiCoO_2$), lithium-nickel oxide ($LiNiO_2$), and lithium-manganese oxide ($LiMn_2O_4$, $LiMnO_2$) are particularly preferable because a high voltage can be obtained.

Examples of the conductive agent are acetylene black, carbon black, and graphite.

Examples of the binder are polytetrafluoroethylene (PTFE), polyvinylidene fluoride (PVDF), an ethylene-propylene-diene copolymer (EPDM), and styrene-butadiene rubber (SBR).

The mixing ratios of the active material, the conductive agent, and the binder are preferably 80 to 95 wt % of the active material, 3 to 20 wt % of the conductive agent, and 2 to 7 wt % of the binder.

Preferable examples of the collector are an aluminum foil, a stainless steel foil, and a nickel foil, each 10 to 40 $\mu$m in thickness.

2) Constitution of negative electrode 6

The negative electrode 6 is manufactured by, e.g., suspending a carbonaceous material and a binder in an appropriate solvent, coating the resultant suspension on a collector, and drying the resultant structure into a thin plate.

Examples of the binder are polytetrafluoroethylene (PTFE), polyvinylidene fluoride (PVDF), an ethylene-propylene-diene copolymer (EPDM), styrene-butadiene rubber (SBR), and carboxymethylcellulose (CMC).

The mixing ratios of the carbonaceous material and the binder are preferably 90 to 98 wt % of the carbonaceous material and 2 to 10 wt % of the binder. In particular, the carbonaceous material is contained in an amount of preferably 5 to 20 mg/cm$^2$ on one side of a collector when the negative electrode 6 is completed.

Preferable examples of the collector are a copper foil, a stainless steel foil, and a nickel foil, each 5 to 30 $\mu$m in thickness.

Examples of the carbonaceous material are those explained in items 2-1) to 2-3) below. Note that the measurements and the definitions of a differential thermal analysis, La, $d_{002}$, Lc, and an intensity ratio $P_{101}/P_{100}$, each for determining the carbonaceous material, are as follows.

(a) The values of a differential thermal analysis were measured in the air at a heating rate of 10° C./min and a sample weight of 3 mg.

(b) All measurement data of X-ray diffraction analysis were obtained by using CuKa, as an X-ray source, and high-purity silicon, as a standard substance. La, $d_{002}$, and Lc were calculated from the position and the half width of each diffraction peak. The calculation was performed by a hlf-width mid-point method using of the Scherrer's equation, $$L = \frac{k\lambda}{\beta \cos\theta},$$

where L represented the size of a crystallite corresponding to diffraction angle $\theta$, $\lambda$ represents the wavelengh of X-ray, and $\beta$ represents an intensity correct.

(c) A length La of a crystallite in the a-axis direction and a length Lc of a crystallite in the c-axis direction were values obtained when K, as a form factor of a Scherrer's equation, was 0.89.

(d) An intensity ratio $P_{101}/P_{100}$ of a (101) diffraction peak $P_{101}$ to a (100) diffraction peak $P_{100}$ obtained by X-ray diffraction analysis was calculated from the height ratio of the peaks.

2-1) Carbonaceous material

This carbonaceous material has an exothermic peak at 700° C. or more, preferably 800° C. or more, and more preferably 840° C. or more when measured by the differential thermal analysis in air. The value of the exothermic peak obtained by the differential thermal analysis is a measure of the carbon-carbon bonding force of a carbonaceous material or form and size of a carbonaceous material. A carbonaceous material having an exothermic peak within this range has a graphite structure developed to a proper degree and exhibits a property of reversibly absorbing and desorbing lithium ions to and from between hexagonal-net-plane layers in the graphite structure. In addition, this carbonaceous material is considered to have few amorphous carbons which are active with respect to a nonaqueous solvent.

A carbonaceous material having an exothermic peak at less than 700° C. contains a carbonaceous material in which a graphite structure is not fully developed yet. Therefore, lithium ions are not much reversibly absorbed to and desorbed from between hexagonal-net-plane layers in the graphite structure. In addition, flatness of a discharge voltage and battery voltage are decreased. It is also considered that a large amount of a fine powder consisting of amorphous carbon atoms which are active with respect to a nonaqueous solvent exists, and so the nonaqueous solvent is easily, reductively decomposed.

In this carbonaceous material, it is required that the intensity ratio $P_{101}/P_{100}$ of the (101) diffraction peak $P_{101}$ to the (100) diffraction peak $P_{100}$ of the graphite structure, obtained by X-ray diffraction analysis, be 0.7 to 2.2. A carbonaceous material having an intensity ratio $P_{101}/P_{100}$ of 0.8 to 1.8 is particularly preferable in that the battery capacity, the charge-discharge efficiency, rapid charge-discharge cycle, and the cycle life can be improved.

It is considered that a carbonaceous material having an intensity ratio $P_{101}/P_{100}$ within the above range has a graphite structure developed to a proper degree, and hexagonal-net-plane layers stacked in this graphite structure have appropriate displacements, twists, and angles to one another. When the stacked hexagonal-net-plane layers have appropriate displacements, twists, and angles to one another as described above, lithium ions diffuse more easily between the hexagonal-net-plane layers, so the carbonaceous material presents a property of reversibly, rapidly absorbing and desorbing a large number of lithium ions. In addition, the carbonaceous material with the above constitution hardly causes collapse of the graphite structure when lithium ions are absorbed to or desorbed from between layers. When the graphite structure is collapsed by absorption and desorption of lithium ions to and from between layers, the amount of absorption and desorption of lithium ions decreases, and surfaces which are active with respect to a nonaqueous solvent are produced, making reductive decomposition of the nonaqueous solvent easier. In addition, fine crystals collapsed similarly, reductively decompose the nonaqueous solvent.

In a carbonaceous material having an intensity ratio $P_{101}/P_{100}$ exceeding 2.2, a graphite structure (e.g., natural graphite) develops to decrease displacements, twists, and angles between hexagonal-net-plane layers. In such a carbonaceous material, the amount of absorption and desorption of lithium ions decreases especially under a charge-discharge condition with a high rate of, e.g., 1 mA/cm$^2$ or more. In addition, the surface of the carbonaceous material with this constitution is active with respect to a nonaqueous solvent. Therefore, the nonaqueous solvent is easily, reductively decomposed by the carbonaceous material, reducing the capacity, the charge-discharge efficiency, and the cycle life of a lithium secondary battery.

A carbonaceous material having an intensity ratio $P_{101}/P_{100}$ of less than 0.7, on the other hand, contains a large amount of a carbonaceous material having an underdeveloped graphite structure, and this excessively increases displacements, twists, and angles between hexagonal-net-plane layers. The carbonaceous material with this constitution, therefore, causes a decrease in reversible absorption and desorption of lithium ions to and from between the hexagonal-net-plane layers, decreasing the capacity, the charge-discharge efficiency, and the cycle life of a lithium secondary battery.

The above carbonaceous material preferably has the characteristics described in items (1) to (8) below in addition to the above-mentioned characteristics.

(1) A carbonaceous material having a mean length La of a crystallite in the a-axis direction of a graphite structure, which is derived from a diffraction peak of a (110) plane obtained by X-ray diffraction analysis, of preferably 20 to 100 nm, and more preferably 40 to 80 nm. Note that the shape of an a-axis plane in the graphite structure of the carbonaceous material is preferably a rectangle.

In the carbonaceous material having La within the above range, a graphite structure is developed to a proper degree, and the length of a crystallite in the a-axis direction is appropriate, so lithium ions easily diffuse between hexagonal-net-plane layers. In addition, the carbonaceous material with the above constitution increases the number of sites through which lithium ions are absorbed and desorbed and hence has a property of facilitating absorption and desorption of a larger number of lithium ions.

A carbonaceous material having La exceeding 100 nm forms giant crystals to decrease rate of lithium ions diffusing between hexagonal-net-plane layers. This makes it difficult to ensure absorption and desorption of lithium ions. In addition, since the surface of this carbonaceous material is active with respect to a nonaqueous solvent, the nonaqueous solvent is easily, reductively decomposed. A carbonaceous material having La of less than 20 nm, on the other hand, contains a large amount of a carbonaceous material in which a graphite structure is not fully developed yet. This may decrease reversible absorption and desorption of lithium ions to and from between hexagonal-net-plane layers.

(2) A carbonaceous material having a mean interplanar distance $d_{002}$ of (002) planes, obtained by X-ray diffraction analysis, of preferably 0.370 nm or less, and more preferably 0.340 nm or less. It is particularly desirable that the mean interplanar distance $d_{002}$ of a carbonaceous material be preferably 0.3358 to 0.3440 nm, more preferably 0.3359 to 0.3380 nm, and most preferably 0.3370 to 0.3380 nm.

In a carbonaceous material having a mean interplanar distance $d_{002}$ within the above range, the interplanar distance between hexagonal-net-plane layers is suitable for rapid absorption and desorption of lithium ions to and from between the hexagonal-net-plane layers.

A carbonaceous material having a mean interplanar distance $d_{002}$ exceeding 0.370 nm has a low capacity and a high overvoltage during charge and discharge, and so the rapid charge-discharge performance tends to decrease. In addition, the battery performance also tends to decrease: for example, the flatness of a voltage during discharge of a battery decreases.

(3) A carbonaceous material having a size Lc of a crystallite in the c-axis direction, obtained by X-ray diffraction analysis of preferably 15 nm or more, and more preferably 20 to 100 nm.

A carbonaceous material having Lc within the above range has a graphite structure that is developed to a proper degree, and exhibits a property of reversibly absorbing and desorbing a large number of lithium ions.

(4) A carbonaceous material having a ratio La/Lc of La to Lc, described above, of 1.3 to 2.5.

A carbonaceous material having La/Lc of less than 1.3 decreases the number of sites through which lithium ions are absorbed and desorbed to and from between carbon layers, and so the negative electrode capacity may decrease. A carbonaceous material having La/Lc exceeding 2.5, on the other hand, increases a diffusion resistance with absorption and desorption of lithium ions. This may degrade the rapid charge-discharge performance.

(5) As a measure of the ratio of a graphite structure to an amorphous structure both constituting a carbonaceous material, a Raman spectrum of the carbonaceous material measured using an argon laser (wavelength 514.5 nm) as a light source is available. The Raman spectrum measured for a carbonaceous material has a peak appearing near 1,360 cm$^{-1}$, which is derived from an amorphous structure, and a peak appearing near 1,580 cm$^{-1}$, which is derived from a graphite structure. A carbonaceous material preferably has a peak intensity ratio, i.e., a ratio R1/R2 of a peak intensity (R1) at 1,360 cm$^{-1}$ to a peak intensity (R2) at 1,580 cm$^{-1}$ in the above argon laser Raman spectrum (wavelength 514.5 nm) of 0.7 or less.

(6) A carbonaceous material having a true density of 2.15 g/cm$^3$ or more. Note that the true density is related to the degree of graphitization of the carbonaceous material.

(7) A carbonaceous material having a sulfur content of 0 to 1,000 ppm.

A carbonaceous material containing sulfur within the above range or not containing sulfur at all increases the amount of absorption and desorption of lithium ions and reduces decomposition of a nonaqueous solvent.

This is so because in a carbonaceous material which has an exothermic peak at 700° C. or more when measured by the differential thermal analysis, and in which a graphite structure is developed to some extent, if the sulfur content is 1,000 ppm or less (including 0 ppm), defects in the graphite structure are small in number, and consequently the graphite structure becomes difficult to collapse and the amount of absorption and desorption of lithium ions increases. Therefore, a lithium secondary battery having a negative electrode containing the above carbonaceous material is improved in capacity, charge-discharge efficiency, and cycle life.

The carbonaceous material having a sulfur content of 1,000 ppm or less (including 0 ppm) can also reduce the decomposition of a nonaqueous solvent, caused by a reaction of the nonaqueous solvent and lithium ions with respect to sulfur or a sulfur compound, and can reduce the retardation of an electrode reaction. Therefore, a lithium secondary battery having a negative electrode containing the above carbonaceous material is improved in charge-discharge efficiency and cycle life.

That is, the reaction between sulfur and lithium ions in the carbonaceous material produces a stable group, such as LiS—, or a compound, such as LiS. It is considered that the production of such a group or a compound prevents lithium from contributing to the reversible absorption-desorption reaction. It is also considered that the compound produced, such as LiS, becomes obstacles between hexagonal-net-plane layers, preventing smooth insertion of lithium ions.

It is, therefore, possible to improve the charge-discharge efficiency and the cycle life of a lithium secondary battery by setting the content of sulfur, which inhibits the performance of a carbonaceous material, to 1,000 ppm or less, or 0 ppm.

(8) A carbonaceous material having a content of each of various metal elements, such as Fe and Ni, of 0 to 50 ppm, a silicon content of 0 to 50 ppm, and an oxygen content of 0 to 500 ppm.

In a carbonaceous material having the content of each impurity element exceeding the above range, lithium ions between carbon layers may be reacted with the impurity element or trapped in it, decreasing the amount of lithium contributing to a battery reaction.

The above carbonaceous material preferably consists of either fibers, which are distributed at a ratio of 90 vol % or more within the range of a length of 0.5 to 100 μm and have an average diameter of 1 to 30 μm, or particles, which are distributed at a ratio of 90 vol % or more within the range of a particle size of 1 to 100 μm and have an average particle size of 1 to 80 μm. In addition, the carbonaceous material in the above form preferably has a specific surface area of 0.1 to 100 m$^2$/g when measured by a BET method using N$_2$ gas adsorption.

The carbonaceous material in the above form can increase the bulk density in the manufacture of a negative electrode. The carbonaceous material in the above form can also decrease the content of a carbonaceous material, which is active with respective to a nonaqueous solvent and has a collapsed graphite crystal structure, or the content of amorphous carbon, thereby suppressing reductive decomposition of the nonaqueous solvent.

In particular, a carbonaceous material containing only 5 vol % or less of fine fibers or particles with a diameter of 0.5 μm or less can further decrease the content of the carbonaceous material with the collapsed graphite crystal structure or the amorphous carbon, thus further reducing reductive decomposition of the nonaqueous solvent.

In contrast, a carbonaceous material having a particle size distribution and a specific surface area, measured by the BET method using N$_2$ gas adsorption, falling outside the above ranges, has large contents of the amorphous carbonaceous material and the carbonaceous material with the collapsed graphite crystal structure, so reductive decomposition of a solvent occurs more easily. In addition, it becomes difficult to manufacture a negative electrode with a high bulk density of the carbonaceous material.

A method of manufacturing the carbonaceous material of item 2-1) above, i.e., the carbonaceous material having an exothermic peak at 700° C. or more when measured by the differential thermal analysis and an intensity ratio P$_{101}$/P$_{100}$ of 0.7 to 2.2, which is the ratio of the (101) diffraction peak P$_{101}$ to the (100) diffraction peak P$_{100}$ of a graphite structure obtained by X-ray diffraction analysis, will be described below.

(i) First, coke is prepared by sintering coal tar, a petroleum pitch, or a synthetic pitch. In addition, a pitch having anisotropy is extracted from these material. The anisotropy of the precursor has optical heterogeneous properties. The typical pith having an anisotropy is a mesophase pitch.

It is preferred that the coal tar, the petroleum pitch, or the synthetic pitch have a small content of sulfur. The use of such a material can provide coke or a pitch with anisotropy, which has a few defects in a lattice of a graphite structure, through a heat treatment at relatively low temperatures. It is particularly preferable to selectively use a material having a few carbon-sulfur chemical bonds in aromatic condensed carbon that an organic substance constitutes. That is, the carbon-sulfur chemical bond in aromatic condensed carbon is hard to rupture compared to a C—S bond in which a sulfur atom is present as a part of a substituent, making elimination of sulfur difficult. Therefore, a material with a few carbon-sulfur chemical bonds in aromatic condensed carbon is preferred.

The coal tar, the petroleum pitch, or the synthetic pitch preferably has a small content of nitrogen. In addition, the smaller the ratio of an alkyl side chain, such as methyl carbon or methylene carbon, in an aromatic ring in the coal tar, the petroleum pitch, or the synthetic pitch, the better the development of a graphite structure. This enables formation of a carbonaceous material with a larger La value obtained by X-ray diffraction. However, a large La value of 100 nm is unpreferable in terms of performance of a negative electrode.

A fibrous carbon material or a spherical carbon material is obtained from the pitch having anisotropy. The fibrous carbon material is obtained by spinning the pitch having anisotropy. The spherical carbon material is obtained by extracting an anisotropic material from the material such as coal tar. In particular, a carbon material in the form of short fibers has advantages of a low cost and a high negative electrode bulk density, among other fibrous carbon materials.

It is desirable that the pitch with anisotropy have a purity of an anisotropic pitch of preferably 95 vol % or more, and more preferably 98 vol % or more. This is so because if the fibrous or spherical carbon material extracted from an anisotropic pitch containing a large amount of an isotropic pitch, as an impurity, is graphitized as will be described later, then collapse of a graphite structure and production of amorphous carbon are caused. If, however, the fibrous or spherical carbon material obtained from a pitch having anisotropy, in which the amount of an anisotropic pitch is large, is graphitized at a high heat treatment temperature of 2,800° C. or more, the graphitization progresses excessively. For this reason, the pitch having anisotropy may contain approximately 1 to 2 vol % of an isotropic pitch.

An example of the high-impurity anisotropic pitch is a mesophase pitch. The fibrous or spherical carbon material obtained from the mesophase pitch has a radial orientation, a lamella orientation, or a Brooks-Taylor type orientation. Since a carbonaceous material obtained from the carbon material having above orientation exhibits a property of smoothly absorbing and desorbing lithium ions, it is effective for rapid charge-discharge. Especially when the spherical carbon material is to be obtained from the mesophase pitch, it is effective to perform a treatment of removing fine mesophase spherical carbons with a particle size of 0.5 μm or less in extracting mesophase spherical carbons from coal tar. A heat treatment in an oxygen atmosphere at 300° C. to 700° C. after the extraction is also effective. These treatments remove by burning fine mesophase spherical carbons adhered to mesophase spherulites or an excess carbon component adhered to the surfaces of these spherical carbons. This suppresses the inhibition of an absorption-desorption reaction of lithium ions in a carbonaceous material obtained by carbonization, pulverization (mill), and graphitization (to be described later).

(ii) Subsequently, at least one material selected from the coke, the fibrous carbon material, and the spherical carbon material is carbonized through a heat treatment.

The heat treatment temperature is preferably 600° C. to 2,000° C., and more preferably 800° C. to 1,500° C. In addition, the heat treatment is preferably performed in an argon flow, and the heat treatment time is preferably set within the range of 0.5 to 30 hours.

(iii) The carbon product thus obtained is pulverized.

The pulverization is preferably performed under the following conditions if the final carbonaceous material is to be obtained in the form of particles. That is, the pulverization is performed by selecting appropriate pulverization conditions, or sieving is performed after the pulverization, such that preferably 90 vol % or more of particles are distributed within the range of a particle size of 1 to 100 μm, and more preferably, fine particles with a particle size of 0.5 μm or less are distributed at a ratio of 5 vol % or less, and the mean particle size is 1 to 80 μm. If, on the other hand, the final carbonaceous material is to be obtained in the form of fibers, the pulverization is performed by selecting proper pulverization conditions, or sieving is performed after the pulverization, such that preferably 90 vol % or more of fibers are distributed within the range of a length of 0.5 to 100 μm, and more preferably, fine fibers with a diameter or a length of 0.5 μm or less are distributed at a ratio of 5 vol % or less, and an average diameter or an average length is 1 to 30 μm. The pulverization and sieving are preferably performed in an inert atmosphere.

(iv) Subsequently, the carbon product thus pulverized is graphitized through a heat treatment at a temperature of 2,000° C. or more, manufacturing a carbonaceous material having the characteristics mentioned earlier.

This graphitization has an effect of graphitizing amorphous carbon, which is produced when the carbon product is pulverized, or graphitizing carbon with a low graphitization degree.

The heat treatment temperature is preferably 2,000° C. to 3,200° C. In addition, the heat treatment is preferably performed in a non-oxidization atmosphere, e.g., an argon flow, and the heat treatment time need only range from one to 30 hours.

Note that when the carbonaceous material is to be manufactured by performing carbonization, pulverization, and graphitization for the coke described above, it is preferable to form a particulate or spherical powder by using a ball mill or a jet mill in the pulverization.

In addition, to obtain the carbonaceous material having little impurities, such as sulfur, it is preferable to perform a treatment of removing the impurities in the manufacture of the carbonaceous material. The removal of sulfur or a sulfur compound from the carbonaceous material can be performed by a heating treatment by reacting a Lewis acid, such as $CuCl_3$, and chlorine gas or metal sodium at a temperature of preferably 2,000° C. to 3,000° C., and more preferably 2,300° C. to 2,800° C. This heating treatment can be performed either simultaneously with the carbonization step or the graphitization step or separately after the graphitization step.

The carbonaceous material having the characteristics described in items (1) and (2) above, i.e., the carbonaceous material having an interplanar distance $d_{002}$ of (002) planes, obtained by X-ray diffraction, of 0.3360 to 0.3380 nm, a ratio La/Lc of the length La in the a-axis direction to the length Lc in the c-axis direction of 1.3 to 2.5, and La of 20 to 100 nm is manufactured by the following method.

(i) First, a fibrous carbon material obtained from a mesophase pitch, which is one of the high-purity anisotropic pitches described above, is prepared.

To obtain the fibrous carbon material from the a mesophase pitch, the mesophase pitch is first spun into short fibers having a fiber length of 100 to 1000 μm by a melt blow method. The spinning conditions in this spinning have an effect on the orientation and the crystal structure of a carbonaceous material finally obtained. The parameters, the fine texture, and the orientation of the crystal can be controlled by properly controlling the nozzle shape, the discharge rate, the cooling rate, and the dividing rate during the spinning. After the spinning, a treatment of imparting infusibility to the product is performed, thereby obtaining a fibrous carbon material.

(ii) Subsequently, the fibrous carbon material is formed into a carbon product through a heat treatment.

The fibrous carbon product obtained by the heat treatment preferably has an interplanar distance $d_{002}$ of (002) planes, obtained by X-ray diffraction, of 0.344 to 0.380 nm. The carbon product having an interplanar distance $d_{002}$ within this range is easily formed into a fibrous carbon product with a short fiber length through pulverization to be described later. Note that a fibrous carbon product having an interplanar distance $d_{002}$ falling outside the above range causes cracks in the longitudinal direction (the direction of a fiber length) in the pulverization step, making formation of short fibers difficult.

The heat treatment temperature is 600° C. to 2,000° C., preferably 800° C. to 1,500° C. The heat treatment is preferably performed in a non-oxidization atmosphere, e.g., an argon flow, and the heat treatment time need only range between 0.5 and 30 hours.

(iii) The fibrous carbon product is then pulverized.

The pulverization is performed by selecting proper pulverization conditions, or sieving is performed after the pulverization, such that preferably 90 vol % or more of the finally obtained carbonaceous material are distributed within the range of a length of 0.5 to 100 μm, and more preferably, fine fibers with a diameter or a length of 0.5 μm or less are distributed at a ratio of 5 vol % or less, and an average diameter or an average length is 1 to 30 μm. The pulverization and the sieving are preferably performed in an inert atmosphere.

(iv) Subsequently, the fibrous carbon product thus pulverized is graphitized through a heat treatment at a temperature of 2,000° C. or more, preferably 2,000° C. to 3,000° C., and more preferably 2,600° C. to 3,000° C., thereby manufacturing a fibrous carbonaceous material having the above-mentioned characteristics.

The heat treatment for the graphitization is preferably performed in a non-oxidization atmosphere, e.g., an argon gas flow. The heat treatment time need only range from 0.5 to 30 hours.

2-2) Carbonaceous material

This carbonaceous material has an exothermic peak at 700° C. or more when measured by the differential thermal analysis, an average length La of a crystallite in the a-axis direction of a graphite structure, which is derived from a diffraction peak of a (110) plane obtained by X-ray diffraction analysis, of 20 to 100 nm, and a sulfur content of 1,000 ppm or less (including 0 ppm).

The above carbonaceous material must have an exothermic peak at 700° C. or more when measured by the differential thermal analysis. The exothermic peak obtained by the differential thermal analysis is preferably 800° C. or more, and more preferably 840° C. or more. The value of the exothermic peak obtained by the differential thermal analysis is a measure of the carbon-carbon bonding force in a carbonaceous material or a form and size of the carbonaceous material. A carbonaceous material having an exothermic peak within this range has a graphite structure developed to a proper degree and hence exhibits a property of reversibly absorbing and desorbing lithium ions to and from between hexagonal-net-plane layers in the graphite structure. In addition, it is considered that this carbonaceous material has little amorphous carbon which is active with respect to a nonaqueous solvent. Note that a carbonaceous material having an exothermic peak at less than 700° C., when measured by the differential thermal analysis, is unpreferable as the negative electrode material for the same reasons as described above for the carbonaceous material of item 2-1).

The carbonaceous material must also have a mean length La of a crystallite in the a-axis direction of a graphite structure, which is derived from the diffraction peak of a (110) plane obtained by X-ray diffraction, of preferably 20 to 100 nm, and more preferably 40 to 80 nm. Note that the shape of an a-axis plane in the graphite structure of this carbonaceous material is preferably a rectangle.

In a carbonaceous material having La within the above range, a graphite structure is developed to a proper degree, and the length of a crystallite in the a-axis direction is also appropriate. This facilitates diffusion of lithium ions between hexagonal-net-plane layers. In addition, the carbonaceous material with the above constitution increases the number of sites, through which lithium ions are absorbed and desorbed, and hence presents a property of absorbing and desorbing a large amount of lithium ions. Note that a carbonaceous material having La falling outside the above range is unpreferable as the negative electrode material for the same reasons as described above for the carbon material of item 2-1).

Furthermore, the above carbonaceous material must have a sulfur content of 0 to 1,000 ppm.

A carbonaceous material containing sulfur within the above range or not containing sulfur at all increases the amount of absorption and desorption of lithium ions and reduces reductive decomposition of a nonaqueous solvent.

This is so because if the sulfur content is 1,000 ppm or less (including 0 ppm) in a carbonaceous material, which exhibits an exothermic peak at 700° C. or more when measured by the differential thermal analysis, and in which a graphite structure is developed to a certain degree, defects in the graphite structure are small in number. This consequently makes collapse of the graphite structure difficult to occur and increases the amount of absorption and desorption of lithium ions. The carbonaceous material having a sulfur content of 1,000 ppm or less (including 0 ppm) can also reduce the decomposition of a nonaqueous solvent, which is caused by a reaction of the nonaqueous solvent and lithium ions with sulfur or a sulfur compound, and can reduce to trap lithium ions and the retardation of an electrode reaction. Note that a carbonaceous material with a sulfur content exceeding 1,000 ppm is unpreferable as the negative electrode material for the same reasons as described above for the carbonaceous material of item 2-1).

The above carbonaceous material is allowed to have a content of each of various metal elements, such as Fe and Ni, of 0 to 50 ppm, a silicon content of 0 to 50 ppm, and an oxygen content of 0 to 500 ppm.

Examples of the carbonaceous material are graphite, which is graphitized from a high-purity material with a low sulfur content, and coke, a carbon fiber, a spherical carbon product, a resin sintered product, and a CVD carbon product, each of which is graphitized or carbonized from a petroleum pitch, coal tar, heavy oil, a synthetic pitch, a synthetic polymer, or an organic resin, each having a high purity with a low sulfur content.

2-3) Carbonaceous material

This carbonaceous material has an exothermic peak at 700° C. or more when measured by the differential thermal analysis, a content of each metal element of 0 to 50 ppm, a silicon content of 0 to 50 ppm, a nitrogen content of 0 to 1,000 ppm, and a sulfur content of 0 to 1,000 ppm.

The above carbonaceous material must have an exothermic peak at 700° C. or more when measured by the differential thermal analysis. The exothermic peak obtained by the differential thermal analysis is preferably 800° C. or more, and more preferably 840° C. or more. The value of the exothermic peak obtained by the differential thermal analysis is a measure of the carbon-carbon bonding force of a carbonaceous material or a form and size of the carbonaceous material. A carbonaceous material having an exothermic peak within this range has a graphite structure developed to a proper degree and exhibits a property of reversibly absorbing and desorbing lithium ions to and from between hexagonal-net-plane layers in the graphite structure. In addition, it is considered that the carbonaceous material has a small amount of amorphous carbon which is active with respect to a nonaqueous solvent. Note that a carbonaceous material having an exothermic peak at less than 700° C., when measured by the differential thermal analysis, is unpreferable as the negative electrode material for the same reasons as described above for the carbonaceous material of item 2-1).

The above carbonaceous material must also have a content of each of various metal elements, such as Fe and Ni, of 0 to 50 ppm, a silicon content of 0 to 50 ppm, an oxygen content of 0 to 500 ppm, and a sulfur content of 0 to 1,000 ppm.

A carbonaceous material containing sulfur within the above range or not containing sulfur at all increases the amount of absorption and desorption of lithium ions and reduces reductive decomposition of a nonaqueous solvent, and reduces to trap lithium ions. Note that a carbonaceous material having a sulfur content exceeding 1,000 ppm is unpreferable as the negative electrode material for the same reasons as described above for the carbonaceous material of item 2-1).

In a carbonaceous material having a content of each impurity element, except for sulfur, exceeding the above range, lithium ions between carbon layers are consumed upon reacting with the impurity elements, decreasing the amount of lithium contributing to a battery reaction.

Examples of the above carbonaceous material are coke and a resin sintered product, each obtained by performing a heat treatment at about 800° C. to about 2,000° C. for a high-purity pitch material, such as coal tar, a petroleum pitch, or a synthetic pitch, and a graphitized product and graphite obtained by performing a heat treatment at about 2,000° C. to about 3,000° C. for the same materials. The carbonaceous material is preferably manufactured by carbonizing mesophase spherical carbons or mesophase pitch carbon fibers, obtained from a mesophase pitch, at about 800° C. to about 2,000° C., or by graphitizing the same material at about 2,000° C. to about 3,000° C. A lithium secondary battery having a negative electrode containing this carbonaceous material has rapid charge-discharge performance, a high capacity, a high charge-discharge efficiency, and a long cycle life.

3) Constitution of nonaqueous electrolyte

The nonaqueous electrolyte contained in the case 1 is prepared by dissolving an electrolytic salt in a nonaqueous solvent.

The nonaqueous solvent is not particularly limited, and so any nonaqueous solvent known as a solvent for a lithium secondary battery can be used. It is, however, preferable to use a nonaqueous solvent substantially consisting of a solvent mixture of ethylene carbonate (EC) and at least one nonaqueous solvent (to be referred to as a second solvent hereinafter), which has a melting point lower than that of ethylene carbonate and has a donor number of 18 or less. Such a nonaqueous solvent is stable with respect to the carbonaceous material with a developed graphite structure, which constitutes a negative electrode, and hardly causes reductive or oxidative decomposition of the nonaqueous electrolyte. This nonaqueous solvent also has an advantage of a high conductivity.

Examples of the second solvent are dimethyl carbonate (DMC), diethyl carbonate (DEC), propylene carbonate (PC), γ-butyrolactone (γ-BL), acetonitrile (AN), nitromethane (NM), nitrobenzene (NB), ethyl acetate (EA), toluene, xylene, and methyl acetate (MA). These second solvents can be used singly or in the form of a mixture of two or more types of them. In particular, the second solvent preferably has a donor number of 16.5 or less.

The viscosity of the second solvent is preferably 28 mp or less at 25° C.

The mixing amount of ethylene carbonate in the solvent mixture is preferably 10% to 80% as a volume ratio. If the mixing amount falls outside this range, reduction in conductivity or decomposition of the solvent may occur to decrease the charge-discharge efficiency. The mixing amount of ethylene carbonate is more preferably 20% to 75% as a volume ratio. The solvation of ethylene carbonate to lithium ions is facilitated by increasing the mixing amount of ethylene carbonate in the nonaqueous solvent to 20 vol % or more, and this can improve the effect of suppressing decomposition of the solvent.

A more preferable composition of the above solvent mixture is a combination of EC and DEC, a combination of EC, PC, and DEC, or a combination of EC, γ-BL, and DEC, and the volume ratio of DEC is preferably set to 60% or less. By setting the ratio of DEC to 60% or less, preferably 35% or less, the flash point of the solvent mixture can be raised, and this improves the safety. However, in order to further decrease the viscosity, ethers, such as diethoxyethane, may be added at a ratio of 30 vol % or less.

Examples of main impurities present in the above solvent mixture (nonaqueous solvent) are water and organic peroxides (e.g., glycols, alcohols, and carboxylic acids). It is considered that each of these impurities forms an insulating film on the surface of a graphitized carbons, increasing the interfacial resistance of an electrode. Therefore, these impurities may cause a decrease in cycle life or capacity. In addition, self-discharge during storage at high temperatures (60° C. or more) may also increase. For these reasons, the amount of these impurities in an electrolyte containing the nonaqueous solvent is preferably decreased as small as possible. More specifically, it is preferable that the content of water be 50 ppm or less and the content of the organic peroxides be 1,000 ppm or less.

Examples of the electrolytic salt contained in the above nonaqueous electrolyte are lithium salts, such as lithium perchlorate ($LiClO_4$), lithium phosphate hexafluoride ($LiPF_6$), lithium borofluoride ($LiBF_4$), arsenolithium hexafluoride ($LiAsF_6$), lithium trifluoromethasulfonate ($LiCF_3SO_3$), and lithium bistrifluoromethylsulfonylimide [$LiN(CF_3SO_2)_2$]. Among these lithium salts, $LiPF_6$, $LiBF_4$, and $LiN(CF_3SO_2)_2$ are preferable. In particular, $LiN(CF_3SO_2)_2$ is desirable because it is excellent in storage characteristics at high temperatures (60° C. or more) and cycle performance. This is so because $LiN(CF_3SO_2)_2$ has a low reactivity with respect to a positive electrode active material and a high chemical stability in the nonaqueous solvent. Each of nonaqueous electrolytes obtained by dissolving $Lin(CF_3SO_2)_2$ into solvent mixtures of EC and $\gamma$-BL; EC, DEC, and $\gamma$-BL; and EC, PC, and DEC exhibits better characteristics including chemical stability, conductivity, and safety, than those of electrolytes obtained by dissolving a lithium salts other than $LiN(CF_3SO_2)_2$ into the above-mentioned solvent mixtures.

The dissolution amount of the electrolytic salt in the nonaqueous solvent is preferably 0.5 to 2.0 mols/l.

Another lithium secondary battery according to the present invention comprises:

a positive electrode housed in a case and containing, as an active material, a lithium metal compound which mainly consists of at least one metal selected from the group consisting of cobalt, nickel, manganese, vanadium, titanium, molybdenum, and iron;

a negative electrode housed in the case and containing a carbonaceous material which has an interplanar distance $d_{002}$ of (002) planes of a graphite structure, obtained by X-ray diffraction analysis, of 0.340 nm or less, and absorbs and desorbs lithium ions;

a separator housed in the case so as to be arranged between the positive and negative electrodes; and a nonaqueous electrolyte contained in the case, wherein a ratio of a thickness of the positive electrode to a thickness of the negative electrode is 2:1 to 0.9:1, and a ratio of a weight per unit area of the positive electrode to a weight per unit volume of the negative electrode is 4:1 to 2:1.

The above positive electrode has the same constitution as described in 1) Constitution of positive electrode mentioned earlier. Especially when the positive electrode has a constitution in which a suspension containing an active material, a conductive agent, and a binder is coated on both the surfaces of a collector such as an aluminum foil, the thickness ratio of the suspensions on the two surfaces in a dried condition is preferably set within the range of 1:1 to 1:1.2.

The bulk density of the positive electrode is preferably set to 2.5 to 4.0 g/cm$^3$. The bulk density of the positive electrode means the weight per unit volume of the electrode except the collector.

The product of the width and the length of the positive electrode preferably ranges between 125 and 500 cm$^2$ with respect to a battery discharge capacity of 1 Ah. The battery discharge capacity means a nominal capacity. If the product of the width and the length is less than 125 cm$^2$, the positive electrode utilization efficiency may decrease to decrease the discharge capacity. If the product of the width and the length exceeds 500 cm$^2$, on the other hand, the bulk density of the positive electrode is reduced because the electrode thickness becomes too small, and this may decrease the discharge capacity.

The above negative electrode is manufactured by, as described in 2) Constitution of negative electrode mentioned earlier, suspending a carbonaceous material and a binder in an appropriate solvent, coating the resultant suspension on a collector, and drying the resultant structure into a thin plate. Especially when the negative electrode has an arrangement in which the suspension is coated on both the surfaces of a collector, the thickness ratio of the suspensions on the two surfaces in a dried condition is preferably set within the range of 1:1 to 1:1.2.

The bulk density of the negative electrode is preferably set to 1.35 to 1.80 g/cm$^3$. The bulk density of the negative electrode means the weight per unit volume of the electrode except the collector.

The electrode area (the product of the width and the length) of the negative electrode is preferably set within the range of 130 to 500 cm$^2$ with respect to a battery discharge capacity of 1 Ah. The negative electrode more preferably has an electrode area larger than an area opposing the positive electrode. If the electrode area is less than 130 cm$^2$, the negative electrode utilization efficiency may decrease to decrease the discharge capacity. If the electrode area exceeds 500 cm$^2$, on the other hand, since the electrode thickness becomes too small, the bulk density of the negative electrode and the mechanical strength of the electrode may decrease.

In the above carbonaceous material, the interplanar distance $d_{002}$ of (002) planes, obtained by X-ray diffraction analysis, is 0.340 nm or less. It is particularly desirable that the carbonaceous material have an interplanar distance $d_{002}$ of preferably 0.3358 to 0.3440 nm, and more preferably 0.3359 to 0.3380 nm.

In a carbonaceous material having an interplanar distance $d_{002}$ within the above range, the interplanar distance between hexagonal-net-plane layers is suitable for smooth absorption and desorption of lithium ions to and from between the hexagonal-net-plane layers.

The carbonaceous material preferably has the characteristics described above for the carbonaceous material of item 2-1). That is, the above-mentioned characteristics are that the exothermic peak is 700° C. or more when measured by the differential thermal analysis, the intensity ratio $P_{101}/P_{100}$ of the (101) diffraction peak $P_{101}$ to the (100) diffraction peak $P_{100}$ of a graphite structure, obtained by X-ray diffraction analysis, is 0.7 to 2.2, the average length La of a crystallite in the a-axis direction of a graphite structure, which is derived from the diffraction peak of a (110) plane obtained by X-ray diffraction analysis, is 20 to 100 nm, the ratio R1/R2 of the peak intensity (R1) at 1,360 cm$^{-1}$ to the peak intensity (R2) at 1,580 cm$^{-1}$ in the argon laser Raman spectrum (wavelength 414.5 nm) is 0.7 or less, the sulfur content is 0 to 1,000 ppm, the content of each of various metal elements, such as Fe and Ni, is 0 to 50 ppm, the silicon content is 0 to 50 ppm, and the oxygen content is 0 to 500 ppm.

The above carbonaceous material is preferably in the form of fibers, which are distributed at a ratio of 90 vol % or more within the range of a length of 0.5 to 100 μm and have an average diameter of 1 to 30 μm, or in the form of particles, which are distributed at a ratio of 90 vol % or more within the range of a particle size of 1 to 100 μm and have an average particle size of 1 to 80 μm. In addition, the carbonaceous material in the above form preferably has a specific surface area of 0.1 to 100 $m^2/g$ when measured by the BET method using $N_2$ gas adsorption.

The ratio of the thickness of the positive electrode to the thickness of the negative electrode must be 2:1 to 0.9:1. The thickness of the positive electrode and the thickness of the negative electrode mean the thickness of coated layers except the collector.

If the thickness of the positive electrode is smaller than that of the above ratio, the battery capacity decreases. If, on the other hand, the thickness of the positive electrode is larger than that of the above ratio, the cycle life is shortened, and the charge-discharge rate characteristic of a battery is degraded. The ratio of the thickness of the positive electrode to the thickness of the negative electrode more preferably ranges between 3:2 and 0.9:1.

The ratio of the weight per unit area of the positive electrode (the weight of the positive electrode except the collector) to the weight per unit area of the negative electrode (the weight of the negative electrode except the collector) must be 4:1 to 2:1.

If the weight of the positive electrode exceeds that of the above ratio, a lithium insertion amount of the carbonaceous material constituting the negative electrode becomes an excess amount, and so a lithium metal compound precipitates on the surface of the negative electrode to cause cycle degradation. In addition, the carbonaceous material constituting the negative electrode has a high charge-discharge efficiency and a good reversibility and therefore does not require an excess positive electrode active material by which the weight of the positive electrode exceeds that of the above ratio. If the weight of the positive electrode is smaller than that of the above ratio, on the other hand, the positive electrode capacity decreases, decreasing the battery capacity and increasing the cycle degradation of the positive electrode.

The nonaqueous electrolyte has the same constitution as described in 3) Constitution of nonaqueous electrolyte mentioned earlier. In particular, the amount of the nonaqueous electrolyte is preferably set to 7 $cm^3$ or less per 1 Ah of a battery discharge capacity. The battery discharge capacity means a nominal capacity.

The amount of the nonaqueous electrolyte is important in that it has an effect on the cycle life, the battery capacity, and the safety of a battery. In a lithium secondary battery comprising a positive electrode containing the specific lithium metal compound described above and a negative electrode containing the above carbonaceous material, the charge-discharge efficiency of the carbonaceous material of the negative electrode is high from the first cycle, and so the electrolyte decomposes very little. Therefore, the above nonaqueous electrolyte need only be contained in the case in an amount by which it can soak the separator and the positive and negative electrodes, so no excess amount is required.

If the amount of the nonaqueous electrolyte exceeds the above range, the safety of a battery is decreased because the amount of the nonaqueous electrolyte becomes too large to occur the electrolyte leak.

Note that although the amount of the nonaqueous electrolyte, by which it can soak the separator and the positive and negative electrodes, is not particularly limited because it depends on the thickness of the separator or the porosities of the positive and negative electrodes, it need only be 2 $cm^3$ or more per 1 Ah of a battery discharge capacity. In this case, the thickness of the separator must be 50 μm or less. If the thickness of the separator exceeds 50 μm, the strength of the separator increases, but the amount of the nonaqueous electrolyte exceeds the above range. The thickness of the separator more preferably ranges between 20 and 40 μm. If the thickness of the separator is less than 20 μm, the amount of the nonaqueous electrolyte decreases, but a short circuit between the positive and negative electrodes or a decrease in safety at high temperatures may occur.

Similar to the lithium secondary battery mentioned earlier, another lithium secondary battery according to the present invention comprises a positive electrode housed in a case and containing a lithium metal compound as an active material, a negative electrode housed in the case and containing a carbonaceous material, which has an interplanar distance $d_{002}$ of (002) planes of a graphite structure, obtained by X-ray diffraction analysis, of 0.340 nm or less and absorbs and desorbs lithium ions, a separator housed in the case so as to be arranged between the positive and negative electrodes, and a nonaqueous electrolyte contained in the case. The bulk density of the negative electrode is 1.35 to 1.80 $g/cm^3$. The bulk density of the negative electrode means the weight per unit volume of the electrode except the collector.

If the bulk density of the negative electrode falls outside the above range, a decrease in battery capacity or a reduction in utilization efficiency of the positive or negative electrode takes place. The bulk density of the negative electrode is more preferably 1.40 to 1.60 $g/cm^3$.

The lithium secondary battery according to the present invention comprises a negative electrode containing a carbonaceous material which has an exothermic peak at 700° C. or more when measured by the differential thermal analysis and an intensity ratio $P_{101}/P_{100}$ of the (101) diffraction peak $P_{101}$ to the (100) diffraction peak $P100$ of a graphite structure, obtained by X-ray diffraction analysis, of 0.7 to 2.2 and absorbs and desorbs lithium ions. This carbonaceous material has a graphite structure which is developed to a proper degree and in which stacked hexagonal-net-plane layers have appropriate displacements, twists, and angles to one another. The use of the negative electrode containing this carbonaceous material enables smooth progress of the absorption-desorption reaction of lithium ions in the negative electrode. In addition, since the amount of carbon which is active with respect to a nonaqueous solvent in the nonaqueous electrolyte is small, reductive decomposition of the nonaqueous solvent can be suppressed. As a result, the lithium secondary battery having this negative electrode can be improved significantly in rapid charge-discharge performance, capacity, charge-discharge efficiency, and cycle life. Furthermore, this lithium secondary battery is low in overvoltage during charge and discharge and can be improved in flatness of a voltage during discharge.

Still another lithium secondary battery according to the present invention comprises a negative electrode containing a carbonaceous material which has an exothermic peak at 700° C. or more when measured by the differential thermal analysis, a mean length La of a crystallite in the a-axis direction, obtained by X-ray diffraction analysis, of 20 to 100 nm, and a sulfur content of 1,000 ppm or less and absorbs and desorbs lithium ions, and a nonaqueous electrolyte consisting of a solvent mixture of ethylene carbonate and at least one nonaqueous solvent, which has a melting point lower than that of ethylene carbonate and a donor number of 18 or less, and a lithium salt dissolved in that solvent mixture.

The carbonaceous material with the above constitution has a graphite structure that is developed to a proper degree, and exhibits a property of allowing easy reversible absorption and desorption of lithium ions to and from between hexagonal-net-plane layers in the graphite structure. The carbonaceous material can also increase the amount of absorption and desorption of lithium ions and reduce decomposition of the nonaqueous solvent in the nonaqueous electrolyte.

The nonaqueous solvent (solvent mixture) contained in the nonaqueous electrolyte is stable with respect to the carbonaceous material having the developed graphite structure, hardly causes reductive or oxidative decomposition, and has a high conductivity.

That is, a nonaqueous electrolyte containing ethylene carbonate alone has an advantage that it is hardly, reductively decomposed by a graphitized carbonaceous material. However, a nonaqueous electrolyte of this type has a high melting point (39° C. to 40° C.), a high viscosity, and consequently a low conductivity and is hence unsuitable for a secondary battery to be operated at normal temperature. The second solvent mixed in ethylene carbonate decreases the viscosity of the solvent mixture to be lower than that of ethylene carbonate, improving the conductivity of the solvent mixture. In addition, the use of the solvent with a donor number of 18 or less (note that the donor number of ethylene carbonate is 16.4) makes selective solvation of ethylene carbonate to lithium ions difficult, suppressing the reductive reaction of the second solvent with respect to the carbonaceous material having the developed graphite structure. Also, by setting the donor number of the second solvent to 18 or less, the oxidative decomposition potential easily becomes 4V or more with respect to the lithium electrode, and this realizes a high-voltage lithium secondary battery.

The nonaqueous electrolyte containing the solvent mixture consisting of ethylene carbonate and the second solvent, therefore, is stable with respect to a negative electrode containing a carbonaceous material which has an exothermic peak at 700° C. or more when measured by the differential thermal analysis, an average length La of a crystallite in the a-axis direction, obtained by X-ray diffraction analysis, of 20 to 100 nm, and a sulfur content of 1,000 ppm or less and absorbs and desorbs lithium ions, thereby bringing about the superior characteristics of the carbonaceous material. For this reason, a lithium secondary battery comprising the negative electrode and the nonaqueous electrolyte described above has a high capacity, a high charge-discharge efficiency, and a long cycle life.

Still another lithium secondary battery according to the present invention comprises a negative electrode containing a carbonaceous material which has an exothermic peak at 700° C. or more when measured by the differential thermal analysis, a content of each metal element of 0 to 50 ppm, a silicon content of 0 to 50 ppm, a nitrogen content of 0 to 1,000 ppm, and a sulfur content of 1,000 ppm or less and absorbs and desorbs lithium ions. A lithium secondary battery of this type has a high charge-discharge efficiency particularly at the first cycle and exhibits an excellent property of reversibly absorbing and desorbing lithium ions.

That is, the carbonaceous material having an exothermic peak at 700° C. or more, when measured by the differential thermal analysis, has a graphite structure that is developed to a proper degree, and exhibits a property of reversibly absorbing and desorbing lithium ions to and from between hexagonal-net-plane layers in the graphite structure. If, for example, sulfur exists in such a carbonaceous material, this sulfur reacts with lithium ions to produce a stable group, such as LiS—, or a compound, such as LiS, decreasing the amount of lithium that contributes to discharge. In addition, the compound, such as $LiS_2$, becomes obstacles between the hexagonal-net-plane layers in the graphite structure to interfere with smooth absorption and desorption of lithium ions, decreasing the charge-discharge efficiency.

The carbonaceous material in which the amounts of elements, such as sulfur, are defined as described above can prevent intercalated lithium ions from being consumed by reacting with impurity elements. This consequently increases the amount of lithium contributing to discharge and enables smooth absorption and desorption of lithium ions, improving the charge-discharge efficiency.

A carbonaceous material from which the above elements are removed decreases strain in a crystallite having a pseudographite structure and can realize a hexagonal-net-plane layer structure more ideal for absorption and desorption of lithium ions. Therefore, the charge-discharge efficiency in particularly the first cycle can be increased.

Still another lithium secondary battery according to the present invention is characterized by comprising a positive electrode containing, as an active material, a lithium metal compound mainly consisting of at least one metal selected from the group consisting of cobalt, nickel, manganese, vanadium, titanium, molybdenum, and iron, and a negative electrode containing a carbonaceous material which has an interplanar distance $d_{002}$ of (002) planes of a graphite structure, obtained by X-ray diffraction analysis, of 0.340 nm or less and absorbs and desorbs lithium ions, wherein the ratio of the thickness of the positive electrode to the thickness of the negative electrode is 2:1 to 0.9:1, and the ratio of the weight per unit area of the positive electrode to the weight per unit volume of the negative electrode is 4:1 to 2:1.

In the above carbonaceous material, a graphite structure is developed to some extent, and the interplanar distance between hexagonal-net-plane layers is suitable for smooth absorption and desorption of lithium ions. Therefore, the utilization efficiency of the active material of the positive electrode can be improved by using the negative electrode containing the carbonaceous material having the above characteristics and the positive electrode containing the specific lithium metal compound as the active material, and by defining the ratio of the thickness of the positive electrode to the thickness of the negative electrode and the ratio of the weight per unit area of the positive electrode and the weight per unit volume of the negative electrode. This can also increase the charge-discharge efficiency of the negative electrode containing the carbonaceous material. As a result, a lithium secondary battery having a rapid charge-discharge performance, a high capacity and an improved cycle life can be obtained.

Still another lithium secondary battery according to the present invention is characterized by comprising a positive electrode containing the above lithium metal compound as an active material, and a negative electrode containing a carbonaceous material which has an interplanar distance $d_{002}$ of 0.340 nm or less and absorbs and desorbs lithium ions, wherein the bulk density of the negative electrode is 1.35 to 1.80 g/cm$^3$.

In the above carbonaceous material, a graphite structure is developed to some extent, and the interplanar distance between hexagonal-net-plane layers is suitable for smooth absorption and desorption of lithium ions. Therefore, the utilization efficiency of the positive and negative electrodes can be improved and the charge-discharge efficiency of the negative electrode can be increased by using the negative electrode containing the carbonaceous material having the above characteristics and the positive electrode containing the specific lithium metal compound as the active material, and by defining the bulk density of the negative electrode. Consequently, a lithium secondary battery having a rapid charge-discharge performance, a high capacity and an improved cycle life can be obtained.

A method of manufacturing a carbonaceous material for a negative electrode of a battery according to the present invention comprises the steps of carbonizing through a heat treatment at least one material selected from coke and one of fibrous and spherical materials obtained from a pitch having anisotropy, particularly mesophase pitch, thereby forming a carbon product, pulverizing the carbon product into a carbon product powder, and graphitizing the carbon product powder through a heat treatment at 2,000° C. or more. This method can manufacture a carbonaceous material for a negative electrode of a battery, which has a predetermined particle size or length, contains little amorphous carbon. This carbonaceous material has an exothermic peak at 700° C. or more when measured by the differential thermal analysis and an intensity ratio $P_{101}/P_{100}$ of the (101) diffraction peak $P_{101}$ to the (100) diffraction peak $P_{100}$ of a graphite structure, obtained by X-ray diffraction analysis, of 0.7 to 2.2. In addition, a fine structure of this carbonaceous material has a radial orientation, a lamella orientation, or a Brooks-Taylar type orientation, so that exhibits a property of smoothly absorbing and desorbing lithium ions. Therefore, by forming a negative electrode from the above carbonaceous material and assembling a lithium secondary battery by using this negative electrode, a lithium secondary battery with a rapid charge-discharge performance, a high capacity and a long cycle life can be obtained because the negative electrode has a superior property of absorbing and desorbing lithium ions and a startling effect of suppressing reductive decomposition of a nonaqueous solvent contained in a nonaqueous electrolyte.

The present invention will be described in more detail below by way of its examples with reference to the cylindrical lithium secondary battery shown in FIG. 1.

EXAMPLE 1

First, a mesophase pitch with a purity of an anisotropic pitch of 100 vol %, obtained from a petroleum pitch with a sulfur content of 8,000 ppm, was spun into short fibers with an average length of 250 μm, and these short fibers were carbonized through a heat treatment in an argon atmosphere at 1,000° C., forming mesophase pitch carbon fibers. These mesophase pitch carbon fibers were found to have a fiber diameter of 12 μm. Subsequently, the carbon fibers thus obtained were pulverized or milled appropriately such that the final carbonaceous material had an average particle size of 25 μm and was distributed at a ratio of 90 vol % within the range of 1 to 50 μm in a particle size distribution, and that particles with a particle size of 0.5 μm or less were removed. Thereafter, the resultant material was graphitized in an argon atmosphere at 3,000° C. and heat-treated in a chlorine gas atmosphere at 2,400° C. These mesophase pitch carbon fibers were found to have a radial texture in the cross sections of fibers.

The resultant carbonaceous material was a graphitized carbon powder with an average particle size of 25 μm, which was distributed at a ratio of 90 vol % within the range of 1 to 50 μm in a particle size distribution, and in which the ratio of particles with a particle size of 0.5 μm or less was 0 vol % in the particle size distribution. The carbonaceous material was found to have a specific surface area of 5 m$^2$/g when measured by a BET method using N$_2$ gas adsorption.

Various parameters obtained by X-ray diffraction analysis were measured for the above carbonaceous material by using a half-width mid-point method. As a result, the value of $P_{101}/P_{100}$ was 1.0, $d_{002}$ was 0.3375 nm, Lc was 21 nm, and La was 40 nm. The exothermic peak measured by a differential thermal analysis was 870° C. In this carbonaceous material, the sulfur content was 100 ppm, the oxygen content was 100 ppm, the nitrogen content was 10 ppm, and the content of each of Fe and Ni was 1 ppm.

Subsequently, 98 wt % of the above carbonaceous material were mixed with 2 wt % of an ethylenepropylene copolymer, and the resultant mixture was coated in an amount of 10 mg/cm$^2$ on a stainless steel foil as a collector, manufacturing a negative electrode.

Separately, 80 wt % of a lithium-cobalt oxide (Li$_x$-CoO$_2$ (0.8 ≦ x ≦ 1)) powder were mixed with 15 wt % acetylene black and 5 wt% of a polytetrafluoroethylene powder. The resultant mixture was formed into a sheet and contact-bonded on an expanded metal collector, thereby manufacturing a positive electrode.

The positive electrode, a separator consisting of a polypropylene porous film, and the negative electrode were stacked in this order, and the resultant structure was spirally wound such that the negative electrode was located outside, manufacturing an electrode group.

Separately, lithium phosphate hexafluoride (LiPF$_6$) was dissolved in an amount of 1.0 mol/l in a solvent mixture (mixing volume ratio 50:50) of ethylene carbonate (EC) and diethyl carbonate (DEC), preparing a nonaqueous electrolyte.

The electrode group and the electrolyte were placed in a cylindrical case having a bottom and consisting of stainless steel, thereby assembling the cylindrical lithium secondary battery shown in FIG. 1.

EXAMPLE 2

The cylindrical lithium secondary battery shown in FIG. 1 was assembled following the same procedures as in Example 1 except that a carbonaceous material and a nonaqueous electrolyte described below were used.

First, mesophase spherulites obtained from a mesophase pitch with a purity of an anisotropic pitch of 98 vol %, which was extracted from low-sulfur coal tar with a sulfur content of 2,000 ppm, were heat-treated in an argon atmosphere at 1,000° C., obtaining mesophase spherical carbons. Subsequently, the mesophase spherical carbons thus obtained were heat-treated in the air at 400° C. to remove particles with a diameter of 0.5 $\mu$m or less adhered to the surfaces of the spherical carbons and a surface layer of the spherical carbons. Thereafter, the resultant mesophase spherical carbons were graphitized in an argon atmosphere at 2,800° C., yielding a graphitized carbonaceous material.

The resultant carbonaceous material was a graphitized carbon powder with an average particle size of 10 $\mu$m, which was distributed at a ratio of 90 vol % within the range of 1 to 30 $\mu$m in a particle size distribution, and in which the ratio of particles with a particle size of 0.5 $\mu$m or less was 2 vol % in the particle size distribution. The carbonaceous material was found to have a specific surface area of 5 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 200 ppm, the oxygen content was 100 ppm, the nitrogen content was 100 ppm, and the content of each of Fe and Ni was 3 ppm.

EXAMPLE 3

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 100 vol %, obtained from a low-sulfur petroleum pitch with a sulfur content of 5,000 ppm, was spun into short fibers with an average length of 300 $\mu$m, and these short fibers were carbonized in an argon atmosphere at 1,000° C., forming mesophase pitch carbon fibers. These mesophase pitch carbon fibers were found to have a fiber diameter of 15 $\mu$m. Subsequently, the carbon fibers thus obtained were pulverized such that the final carbonaceous material had an average particle size of 25 $\mu$m and was distributed at a ratio of 90 vol % within the range of 1 to 60 $\mu$m in a particle size distribution, and that particles with a particle size of 0.5 $\mu$m or less were removed. Thereafter, the resultant material was graphitized through a heat treatment in an argon atmosphere at 3,000° C., yielding a carbonaceous material.

The resultant carbonaceous material was a graphitized carbon powder with an average particle size of 20 $\mu$m, which was distributed at a ratio of 90 vol % within the range of 1 to 60 $\mu$m in a particle size distribution, and in which the ratio of particles with a particle size of 0.5 $\mu$m or less was 1 vol % in the particle size distribution. The carbonaceous material was found to have a specific surface area of 5 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 200 ppm, the oxygen content was 100 ppm, the nitrogen content was 100 ppm, and the content of each of Fe and Ni was 2 ppm.

EXAMPLE 4

The cylindrical lithium secondary battery shown in FIG. 1 was assembled following the same procedures as in Example 1 except that a carbonaceous material and a nonaqueous electrolyte described below were used.

First, petroleum coke obtained from a low-sulfur petroleum pitch with a sulfur content of 5,000 ppm was carbonized through a heat treatment in an argon atmosphere at 1,000° C. Subsequently, the petroleum coke was pulverized such that the final carbonaceous material had an average particle size of 15 $\mu$m and was distributed at a ratio of 90 vol % within the range of 1 to 30 $\mu$m in a particle size distribution, and that particles with a particle size of 0.5 $\mu$m or less were removed. Thereafter, the resultant material was graphitized through a heat treatment in an argon atmosphere at 2,800° C., yielding a carbonaceous material.

The resultant carbonaceous material was a graphitized carbon powder with an average particle size of 25 $\mu$m, in which the ratio of particles with a particle size of 0.5 $\mu$m or less was 1 vol % in a particle size distribution. The carbonaceous material was found to have a specific surface area of 5 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 700 ppm, the oxygen content was 200 ppm, the nitrogen content was 300 ppm, and the content of each of Fe and Ni was 3 ppm.

EXAMPLE 5

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 100 vol %, obtained from a low-sulfur petroleum pitch with a sulfur content of 5,000 ppm, was spun into short fibers with an average length of 300 $\mu$m, and these short fibers were carbonized in an argon atmosphere at 3,000° C., forming mesophase pitch carbon fibers. Subsequently, these mesophase pitch carbon fibers were pulverized such that the final carbonaceous material had an average particle size of 30 $\mu$m and was distributed at a ratio of 90 vol % within the range of 1 to 60 $\mu$m in a particle size distribution, and that particles with a particle size of 0.5 $\mu$m or less were removed. The resultant carbonized powder was again heat-treated at a temperature of 2,500° C., yielding a carbonaceous material.

The resultant carbonaceous material was a graphitized carbon powder with an average particle size of 30 μm, in which the ratio of particles with a particle size of 0.5 μm or less was 5 vol % in a particle size distribution. The carbonaceous material was found to have a specific surface area of 8 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 200 ppm, the oxygen content was 100 ppm, the nitrogen content was 100 ppm, and the content of each of Fe and Ni was 1 ppm.

EXAMPLE 6

The cylindrical lithium secondary battery shown in FIG. 1 was assembled following the same procedures as in Example 1 except that a carbonaceous material and a nonaqueous electrolyte described below were used.

First, mesophase spherulites were obtained from a mesophase pitch with a purity of an anisotropic pitch of 98 vol %, which was extracted from coal tar with a sulfur content of 5,000 ppm and a nitrogen content of 7,000 ppm. These mesophase spherulites were heat-treated in an argon atmosphere at 1,000° C., obtaining mesophase spherical carbons. These mesophase spherical carbons were found to have a lamella orientation. Subsequently, the mesophase spherical carbons thus obtained were heat-treated at 400° C. to remove particles with a diameter of 0.5 μm or less adhered to the surfaces of the spherical carbons and a surface layer of spherical carbons. Thereafter, the resultant mesophase spherical carbons were graphitized through a heat treatment in an argon atmosphere at 3,000° C., yielding a carbonaceous material.

The resultant carbonaceous material was a graphitized carbon powder with an average particle size of 10 μm, in which the ratio of particles with a particle size of 0.5 μm or less was 3 vol % in a particle size distribution. The carbonaceous material was found to have a specific surface area of 3 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis. In this carbonaceous material, the sulfur content was 400 ppm, the content of each of oxygen and nitrogen was 500 ppm or less, and the content of each of Fe and Ni was 50 ppm or less.

The nonaqueous electrolyte used had a composition in which lithium phosphate hexafluoride (LiPF₆) was dissolved in an amount of 1.0 mol/l in a solvent mixture (mixing volume ratio 50:30:20) of ethylene carbonate (EC), diethyl carbonate (DEC), and γ-butyrolactone (γ-BL). Note that the donor number of diethyl carbonate was 16 and that of γ-butyrolactone was 15.9. In this nonaqueous electrolyte, the content of H₂O was 20 ppm or less, and that of ethylene glycol was 100 ppm or less. Table 1 also shows the nonaqueous solvent contained in the nonaqueous electrolyte.

EXAMPLE 7

The cylindrical lithium secondary battery shown in FIG. 1 was assembled following the same procedures as in Example 1 except that a carbonaceous material described below and a nonaqueous electrolyte similar to that of Example 6 were used.

First, a mesophase pitch with a purity of an anisotropic pitch of 99 vol %, obtained from a low-sulfur petroleum pitch with a sulfur content of 5,000 ppm, was spun into short fibers, and these short fibers were carbonized at 1,000° C., forming mesophase pitch carbon fibers. These mesophase pitch carbon fibers were found to have a radial orientation in the cross sections of fibers and an average fiber diameter of 7 μm. Subsequently, the mesophase pitch carbon fibers were graphitized through a heat treatment at 3,000° C. and pulverized such that the final carbonaceous material had an average particle size of 30 μm and was distributed at a ratio of 90 vol % within the range of 1 to 80 μm in a particle size distribution, and that particles with a particle size of 0.5 μm or less were removed. Thereafter, the resultant material was again heat-treated in an argon atmosphere at 2,500° C., yielding a carbonaceous material.

The resultant carbonaceous material was a graphitized carbon powder with an average particle size of 28 μm, in which the ratio of particles with a particle size of 0.5 μm or less was 3 vol % in a particle size distribution. The carbonaceous material was found to have a specific surface area of 9 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 700 ppm, the oxygen content was 200 ppm, and the nitrogen content was 400 ppm.

EXAMPLE 8

The cylindrical lithium secondary battery shown in FIG. 1 was assembled following the same procedures as in Example 1 except that a carbonaceous material similar to that of Example 6 and a nonaqueous electrolyte described below were used.

The nonaqueous electrolyte used had a composition in which lithium phosphate hexafluoride (LiPF₆) was dissolved in an amount of 1.0 mol/l in a solvent mixture (mixing volume ratio 60:30:20) of ethylene carbonate (EC), diethyl carbonate (DEC), and methyl acetate (MA). Note that the donor number of diethyl carbonate was 16.5 and that of methyl acetate was 15.9. In this nonaqueous electrolyte, the content of H₂0 was 20 ppm or less, and that of ethylene glycol was 100 ppm or less. Table 1 also shows the nonaqueous solvent contained in the nonaqueous electrolyte.

EXAMPLE 9

The cylindrical lithium secondary battery shown in FIG. 1 was assembled following the same procedures as in Example 1 except that a carbonaceous material similar to that of Example 6 and a nonaqueous electrolyte described below were used.

The nonaqueous electrolyte used had a composition in which lithium phosphate hexafluoride (LiPF$_6$) was dissolved in an amount of 1.0 mol/l in a solvent mixture (mixing volume ratio 60:30:20) of ethylene carbonate (EC), γ-butyrolactone (γ-BL), and nitromethane (NM). Note that the donor number of γ-butyrolactone was 15.9 and that of nitromethane was 2.7. In this nonaqueous electrolyte, the content of H$_2$O was 20 ppm or less, and that of ethylene glycol was 100 ppm or less. Table 1 also shows the nonaqueous solvent contained in the nonaqueous electrolyte.

EXAMPLE 10

The cylindrical lithium secondary battery shown in FIG. 1 was assembled following the same procedures as in Example 1 except that a carbonaceous material similar to that of Example 7 and a nonaqueous electrolyte described below were used.

The nonaqueous electrolyte used had a composition in which lithium bistrifluormethylsulfonylimide [LiN(CF$_3$SO$_2$)$_2$] was dissolved in an amount of 1.0 mol/l in a solvent mixture (mixing volume ratio 60:40) of ethylene carbonate (EC) and γ-butyrolactone (γ-BL). Note that the donor number of γ-butyrolactone was 15.9. In this nonaqueous electrolyte, the content of H$_2$O was 20 ppm or less, and that of ethylene glycol was 100 ppm or less. Table 1 also shows the nonaqueous solvent contained in the nonaqueous electrolyte.

EXAMPLE 11

The cylindrical lithium secondary battery shown in FIG. 1 was assembled following the same procedures as in Example 1 except that a carbonaceous material similar to that of Example 7 and a nonaqueous electrolyte described below were used.

The nonaqueous electrolyte used had a composition in which lithium phosphate hexafluoride (LiPF$_6$) was dissolved in an amount of 1.0 mol/l in a solvent mixture (mixing volume ratio 50:10:40) of ethylene carbonate (EC), propylene carbonate (PC), and diethyl carbonate (DEC). Note that the donor number of diethyl carbonate was 16.5. In this nonaqueous electrolyte, the content of H$_2$O was 20 ppm or less, and that of ethylene glycol was 100 ppm or less. Table 1 also shows the nonaqueous solvent contained in the nonaqueous electrolyte.

EXAMPLE 12

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 99 vol %, obtained from a petroleum pitch with a sulfur content of 8,000 ppm, was spun into short fibers with an average length of 180 μm, and these short fibers were carbonized at 1,000° C., forming mesophase pitch carbon fibers. These mesophase pitch carbon fibers were found to have a fiber diameter of 15 μm. Subsequently, the carbon fibers were pulverized such that the final carbonaceous material had an average particle size of 30 μm and was distributed at a ratio of 90 vol % within the range of 1 to 80 μm in a particle size distribution, and that particles with a particle size of 0.5 μm or less were removed. Thereafter, the mesophase pitch carbon fibers thus pulverized were graphitized through a heat treatment in a gas mixture atmosphere of chlorine gas and argon gas at 2,500° C., yielding a carbonaceous material.

The resultant carbonaceous material was a graphitized carbon powder with an average particle size of 30 μm, which was distributed at a ratio of 90 vol % within the range of 1 to 80 μm in a particle size distribution, and in which the ratio of particles with a particle size of 0.5 μm or less was 3 vol % in the particle size distribution. The carbonaceous material was found to have a specific surface area of 4 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis. In this carbonaceous material, the sulfur content was 100 ppm, the oxygen content was 100 ppm, the nitrogen content was 100 ppm, and the content of each of Fe, Ni, V, Al, Cu, Ca, K, Zn, Cr, and Si was 1 ppm.

The nonaqueous electrolyte used had a composition in which lithium phosphate hexafluoride (LiPF$_6$) was dissolved in an amount of 1.0 mol/l in a solvent mixture (mixing volume ratio 50:50) of ethylene carbonate (EC) and propylene carbonate (PC). In this nonaqueous electrolyte, the content of H$_2$O was 20 ppm or less, and that of ethylene glycol was 100 ppm or less. Table 1 also shows the nonaqueous solvent contained in the nonaqueous electrolyte.

EXAMPLE 13

The cylindrical lithium secondary battery shown in FIG. 1 was assembled following the same procedures as in Example 1 except that a carbonaceous material described below and a nonaqueous electrolyte similar to that of Example 12 were used.

First, a mesophase pitch with a purity of an anisotropic pitch of 99 vol %, obtained from a petroleum pitch with a sulfur content of 8,000 ppm, was spun into short fibers with an average length of 350 μm, and these fibers were carbonized at 1,000° C., forming mesophase pitch carbon fibers. These mesophase pitch carbon fibers were found to have a fiber diameter of 7 μm. Subsequently, the carbon fibers were pulverized such that the final carbonaceous material had an average particle size of 30 μm and was distributed at a ratio of 90 vol % within the range of 1 to 80 μm in a particle size distribution, and that particles with a particle size of 0.5 μm or less were removed. Thereafter, the mesophase pitch carbon fibers thus pulverized were graphitized through a heat treatment in a gas mixture atmosphere of chlorine gas and argon gas at 2,800° C., yielding a carbonaceous material.

The resultant carbonaceous material was a graphitized carbon powder with an average particle size of 30 μm, which was distributed at a ratio of 90 vol % within the range of 1 to 80 μm in a particle size distribution, and in which the ratio of particles with a particle size of 0.5 μm or less was 3 vol % in the particle size distribution. The carbonaceous material was found to have a specific surface area of 4 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 100 ppm, the oxygen content was 100 ppm, the nitrogen content was 100 ppm, and the content of each of Fe, Ni, V, Al, Cu, Ca, K, Zn, Cr, and Si was 1 ppm.

EXAMPLE 14

The cylindrical lithium secondary battery shown in FIG. 1 was assembled following the same procedures as in Example 1 except that a carbonaceous material described below and a nonaqueous electrolyte similar to that of Example 12 were used.

First, mesophase spherulites were obtained from a mesophase pitch with a purity of an anisotropic pitch of 98 vol %, which was extracted from coal tar with a sulfur content of 2,000 ppm and a nitrogen content of 1,200 ppm. These mesophase spherulites were carbonized at 1,000° C., obtaining mesophase spherical carbons. Subsequently, the mesophase spherical carbons thus obtained were graphitized through a heat treatment in a gas mixture atmosphere of chlorine gas and argon gas at 2,800° C., yielding a carbonaceous material.

The resultant carbonaceous material was a graphitized carbon powder with an average particle size of 5 μm, which was distributed at a ratio of 90 vol % within the range of 1 to 30 μm in a particle size distribution, and in which the ratio of particles with a particle size of 0.5 μm or less was 5 vol % in the particle size distribution. The carbonaceous material was found to have a specific surface area of 3 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 100 ppm, the oxygen content was 100 ppm, the nitrogen content was 100 ppm, and the content of each of Fe, Ni, V, Al, Cu, Ca, K, Zn, Cr, and Si was 1 ppm.

EXAMPLE 15

The cylindrical lithium secondary battery shown in FIG. 1 was assembled following the same procedures as in Example 1 except that a carbonaceous material described below and a nonaqueous electrolyte similar to that of Example 12 were used.

First, a mesophase pitch with a purity of an anisotropic pitch of 99 vol %, obtained from a petroleum pitch with a sulfur content of 8,000 ppm, was spun into short fibers with an average length of 220 μm, and these fibers were carbonized at 1,000° C., forming mesophase pitch carbon fibers. These mesophase pitch carbon fibers were found to have a fiber diameter of 12 μm. Subsequently, the mesophase pitch carbon fibers were pulverized such that the final carbonaceous material had an average particle size of 30 μm and was distributed at a ratio of 90 vol % within the range of 1 to 60 μm in a particle size distribution, and that particles with a particle size of 0.5 μm or less were removed. Thereafter, the mesophase pitch carbon fibers thus pulverized were graphitized through a heat treatment in an argon gas atmosphere at 3,000° C., yielding a carbonaceous material.

The resultant carbonaceous material was a graphitized carbon powder with an average particle size of 30 μm, which was distributed at a ratio of 90 vol % within the range of 1 to 60 μm in a particle size distribution, and in which the ratio of particles with a particle size of 0.5 μm or less was 3 vol % in the particle size distribution. The carbonaceous material was found to have a specific surface area of 9 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 600 ppm, the oxygen content was 100 ppm, the nitrogen content was 100 ppm, and the content of each of Fe, Ni, V, Al, Cu, Ca, K, Zn, Cr, and Si was 3 ppm.

EXAMPLE 16

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 95 vol %, obtained from a petroleum pitch with a sulfur content of 8,000 ppm, was spun into short fibers with an average length of 500 μm, and these fibers were carbonized at 1,000° C., forming mesophase pitch carbon fibers. These mesophase pitch carbon fibers were found to have a fiber diameter of 3 μm. Subsequently, the mesophase pitch carbon fibers were heat-treated in a gas mixture atmosphere of chlorine gas and argon gas at 2,300° C. and pulverized such that particles with a particle size of 0.5 μm or less were removed.

The resultant carbonaceous material was a graphitized carbon powder with an average particle size of 15 μm, which was distributed at a ratio of 90 vol % within the range of 1 to 80 μm in a particle size distribution, and in which the ratio of particles with a particle size of 0.5 μm or less was 0 vol % in the particle size distribution. The carbonaceous material was found to have a specific surface area of 5 m$^2$/g when measured by a BET method using N$_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis. In this carbonaceous material, the sulfur content was 100 ppm, the oxygen content was 100 ppm, the nitrogen content was 100 ppm, and the content of each of Fe and Ni was 1 ppm.

The nonaqueous electrolyte used had a composition in which lithium phosphate hexafluoride (LiPF$_6$) was dissolved in an amount of 1.0 mol/l in a solvent mixture (mixing volume ratio 50:50) of ethylene carbonate and diethyl carbonate. Note that the donor number of diethyl carbonate was 16.5. In this nonaqueous electrolyte, the content of H$_2$O was 20 ppm or less, and that of ethylene glycol was 100 ppm or less. Table 1 also shows the nonaqueous solvent contained in the nonaqueous electrolyte.

EXAMPLE 17

The cylindrical lithium secondary battery shown in FIG. 1 was assembled following the same procedures as in Example 1 except that a carbonaceous material described below and a nonaqueous electrolyte similar to that of Example 12 were used.

First, a mesophase pitch with a purity of an anisotropic pitch of 99 vol %, obtained from a low-sulfur petroleum pitch with a sulfur content of 5,000 ppm, was spun into short fibers with an average length of 250 μm, and these fibers were carbonized in an argon gas atmosphere at 1,000° C., forming mesophase pitch carbon fibers. These mesophase pitch carbon fibers were found to have a fiber diameter of 12 μm. Subsequently, the carbon fibers were pulverized such that the final carbonaceous material had an average particle size of 30 μm and was distributed at a ratio of 90 vol % within the range of 1 to 80 μm in a particle size distribution, and that particles with a particle size of 0.5 μm or less were removed.

The resultant carbonaceous material was a graphitized carbon powder with an average particle size of 30 μm, which was distributed at a ratio of 90 vol % within the range of 1 to 80 μm in a particle size distribution, and in which the ratio of particles with a particle size of 0.5 μm or less was 0 vol % in the particle size distribution. The carbonaceous material was found to have a specific surface area of 3 m²/g when measured by a BET method using $N_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 1 below. Table 1 also shows the exothermic peak measured by a differential thermal analysis and the nonaqueous solvent contained in the nonaqueous electrolyte used. In this carbonaceous material, the sulfur content was 1,000 ppm, the oxygen content was 100 ppm, the nitrogen content was 100 ppm, and the content of each of Fe, Ni, V, Al, Cu, Ca, K, Zn, Cr, and Si was 3 ppm.

TABLE 1

| Example | Material | $P_{101}/P_{100}$ | Position of peak (°C.) measured by differential thermal analysis | $d_{002}$ (nm) | Lc (nm) | La (nm) | S content (ppm) | Nonaqueous solvent; Mixing ratio in parentheses |
|---|---|---|---|---|---|---|---|---|
| 1 | Mesophase pitch fibers | 1.0 | 870 | 0.3375 | 21 | 40 | 100 | EC/DEC (50/50) |
| 2 | Mesophase globules | 2.15 | 850 | 0.3359 | 37 | 56 | 200 | EC/DEC (50/50) |
| 3 | Mesophase pitch fibers | 1.0 | 865 | 0.3370 | 21 | 41 | 200 | EC/DEC (50/50) |
| 4 | Petroleum coke | 1.78 | 790 | 0.3357 | 30 | 41 | 700 | EC/DEC (50/50) |
| 5 | Mesophase pitch fibers | 0.9 | 830 | 0.3378 | 20 | 40 | 200 | EC/DEC (50/50) |
| 6 | Mesophase globules | 1.2 | 854 | 0.3380 | 20 | 45 | 400 | EC/γ-BL/DEC (50/30/20) |
| 7 | Mesophase pitch fibers | 1.0 | 865 | 0.3370 | 21 | 40 | 400 | EC/γ-BL/DEC (50/30/20) |
| 8 | Mesophase globules | 1.2 | 854 | 0.3380 | 20 | 45 | 400 | EC/γ-BL/MA (60/30/10) |
| 9 | Mesophase globules | 1.2 | 854 | 0.3380 | 20 | 45 | 400 | EC/γ-BL/NM (60/30/10) |
| 10 | Mesophase pitch fibers | 1.0 | 865 | 0.3370 | 21 | 40 | 400 | EC/γ-BL (60/40) |
| 11 | Mesophase pitch fibers | 1.0 | 865 | 0.3370 | 21 | 40 | 400 | EC/PC/DE (50/10/40) |
| 12 | Mesophase pitch fibers | 0.75 | 880 | 0.3395 | 17 | 25 | 100 | EC/PC (50/50) |
| 13 | Mesophase pitch fibers | 1.1 | 850 | 0.3380 | 20 | 40 | 100 | EC/PC (50/50) |
| 14 | Mesophase globules | 1.0 | 860 | 0.3359 | 35 | 50 | 100 | EC/PC (50/50) |
| 15 | Mesophase pitch fibers | 1.0 | 854 | 0.3375 | 21 | 45 | 400 | EC/PC (50/50) |
| 16 | Mesophase pitch fibers | 0.6 | 790 | 0.3410 | 17.7 | 32 | 100 | EC/DEC (50/50) |
| 17 | Mesophase pitch fibers | 0 | 700 | 0.3600 | 1.5 | 3.4 | 800 | EC/PC (50/50) |

EXAMPLE 18

A mesophase pitch with a purity of an anisotropic pitch of 100 vol %, obtained from a petroleum pitch with a sulfur content of 8,000 ppm, was spun into short fibers with an average length of 250 μm, and these short fibers were carbonized through a heat treatment in an argon gas atmosphere at 1,000° C., forming mesophase pitch carbon fibers. These mesophase pitch carbon fibers were found to have a fiber diameter of 12 μm. Subsequently, the carbon fibers thus obtained were pulverized appropriately such that the final carbonaceous material had an average fiber length of 30 μm and was distributed at a ratio of 90 vol % within the range of 1 to 50 μm in a particle size distribution, and that the ratio of particles with a particle size of 0.5 μm or less was 5 vol % or less. Thereafter, the resultant material was graphitized in a vacuum at 3,000° C., yielding a carbonaceous material.

The resultant carbonaceous material was a graphitized carbon powder with an average fiber length of 30 μm, which was distributed at a ratio of 90 vol % within the range of 1 to 50 μm in a particle size distribution. The carbonaceous material was found to have a specific surface area of 5 m²/g when measured by a BET method using $N_2$ gas adsorption. Note that the orientation of a crystallite observed by an electron microscope was radial.

Various parameters obtained by X-ray diffraction analysis were measured for the above carbonaceous material by using a half-width mid-point method. As a result, the value of $P_{101}/P_{100}$ was 1.0, $d_{002}$ was 0.3375 nm, Lc was 21 nm, La was 40 nm, and La/Lc was 1.91. In this carbonaceous material, the sulfur content was 100 ppm, the oxygen content was 100 ppm or less, the nitrogen content was 100 ppm or less, and the content of each of Fe and Ni was 1 ppm. The values of $P_{101}/P_{100}$, $d_{002}$, Lc, La, and La/Lc, and the sulfur content are summarized in Table 2 below.

Subsequently, 96.7 wt % of the above carbonaceous material were mixed with 2.2 wt % of styrenebutadiene rubber and 1.1 wt % of carboxymethylcellulose, and the resultant mixture was coated on a copper foil as a collector, manufacturing a negative electrode.

Separately, toluene was added to a mixture of 91 wt % of a lithium-cobalt oxide ($Li_xCoO_2$ ($0.8 \leq x \leq 1$)) powder, 3.5 wt % of acetylene black, 3.5 wt % of graphite, and 2 wt % of an ethylenepropylenediene powder, and the resultant material was mixed sufficiently. The resultant mixture was coated on a 30 μm thick aluminum foil as a collector, and the resultant structure was pressed, thereby manufacturing a positive electrode.

The positive electrode, a separator consisting of a polypropylene porous film, and the negative electrode were stacked in this order, and the resultant structure was spirally wound such that the negative electrode was located outside, manufacturing an electrode group.

Separately, lithium phosphate hexafluoride ($LiPF_6$) was dissolved in an amount of 1.0 mol/l in a solvent mixture (mixing volume ratio 40:30:30) of ethylene carbonate (EC), propylene carbonate (PC), and diethyl carbonate (DEC), preparing a nonaqueous electrolyte.

The electrode group and the electrolyte were placed in a cylindrical vessel having a bottom and consisting of stainless steel, thereby assembling the cylindrical lithium secondary battery shown in FIG. 1.

EXAMPLE 19

The cylindrical lithium secondary battery shown in FIG. 1 was assembled following the same procedures as in Example 18 except that a carbonaceous material and a nonaqueous electrolyte described below were used.

A mesophase pitch with a purity of an anisotropic pitch of 100 vol %, obtained from a petroleum pitch with a sulfur content of 8,000 ppm, was spun into short fibers with an average length of 250 μm, and these short fibers were carbonized through a heat treatment in an argon gas atmosphere at 1,000° C., forming mesophase pitch carbon fibers. These mesophase pitch carbon fibers were found to have a fiber diameter of 16 μm. Subsequently, the carbon fibers were pulverized appropriately such that the final carbonaceous material had an average fiber length of 40 μm and was distributed at a ratio of 90 vol % within the range of 1 to 60 μm in a particle size distribution, and that particles with a particle size of 0.5 μm or less were removed. Thereafter, the resultant material was graphitized in a vacuum at 3,000° C., thereby yielding a carbonaceous material.

The resultant carbonaceous material was a graphitized carbon powder with an average fiber length of 30 μm, which was distributed at a ratio of 90 vol % within the range of 1 to 60 μm in a particle size distribution, and in which the ratio of particles with a particle size of 0.5 μm or less was 0 vol % in the particle size distribution. The carbonaceous material was found to have a specific surface area of 3 m²/g when measured by a BET method using $N_2$ gas adsorption. Note that the orientation of a crystallite in the cross sections of the fibers observed by an electron microscope was radial.

Various parameters obtained by X-ray diffraction analysis were measured for the above carbonaceous material by using a half-width mid-point method. As a result, the value of $P_{101}/P_{100}$ was 1.0, $d_{002}$ was 0.3371 nm, Lc was 21 nm, La was 23 nm, and La/Lc was 1.33. In this carbonaceous material, the sulfur content was 100 ppm or less, the oxygen content was 100 ppm or less, the nitrogen content was 100 ppm or less, and the content of each of Fe and Ni was 1 ppm. The values of $P_{101}/P_{100}$, $d_{002}$, Lc, La, and La/Lc, and the sulfur content are summarized in Table 2 below.

The nonaqueous electrolyte used contained 1 mol/l of $LiN(CF_3SO_2)_2$ as an electrolytic salt. Table 2 also shows the nonaqueous solvent contained in the nonaqueous electrolyte.

TABLE 2

| Example | Material | $P_{101}/P_{100}$ | Position of peak (°C.) measured by differential thermal analysis | $d_{002}$ (nm) | Lc (nm) | La (nm) | La/Lc | S content (ppm) | Nonaqueous solvent; Mixing ratio in parentheses |
|---|---|---|---|---|---|---|---|---|---|
| 18 | Mesophase pitch fibers | 1.0 | 805 | 0.3375 | 21 | 40 | 1.91 | 100 or less | EC/PC/DEC (40:30:30) |
| 19 | Mesophase pitch fibers | 1.0 | 815 | 0.3371 | 21 | 28 | 1.33 | 100 or less | EC/PC/DEC (40:30:30) |

COMPARATIVE EXAMPLE 1

The cylindrical lithium secondary battery shown in FIG. 1 was assembled following the same procedures as in Example 1 except that a carbonaceous material described below was used.

First, mesophase spherulites were obtained from a mesophase pitch extracted from coal tar with a sulfur content of 8,000 ppm and a nitrogen content of 9,000 ppm. These mesophase spherulites were carbonized in an argon atmosphere at 1,000° C., obtaining mesophase spherical carbons. These mesophase spherical carbons were found to have a purity of an anisotropic pitch of 100 vol %. Subsequently, the mesophase spherical carbons thus obtained were graphitized at 2,800° C., yielding a carbonaceous material.

The resultant carbonaceous material was a graphitized carbon powder with an average particle size of 20 μm, which was distributed at a ratio of 90 vol % within the range of 0.1 to 40 μm in a particle size distribution, and in which the ratio of particles with a particle size of 0.5 μm or less was 7.5 vol % in the particle size distribution. The carbonaceous material was found to have a specific surface area of 5.1 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 3 below. Table 3 also shows the exothermic peak measured by a differential thermal analysis and the nonaqueous solvent contained in the nonaqueous electrolyte used. In this carbonaceous material, the sulfur content was 600 ppm, the oxygen content was 100 ppm, the nitrogen content was 100 ppm, and the content of each of Fe and Ni was 3 ppm.

COMPARATIVE EXAMPLE 2

The cylindrical lithium secondary battery shown in FIG. 1 was assembled following the same procedures as in Example 1 except that a carbonaceous material described below was used.

The carbonaceous material used was obtained by pulverizing natural graphite.

The resultant carbonaceous material was a graphitized carbon powder with an average particle size of 15 μm, which was distributed at a ratio of 90 vol % within the range of 1 to 80 μm in a particle size distribution, and in which the ratio of particles with a particle size of 0.5 μm or less was 8 vol % in the particle size distribution. The carbonaceous material was found to have a specific surface area of 5.1 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 3 below. Table 3 also shows the exothermic peak measured by a differential thermal analysis and the nonaqueous solvent contained in the nonaqueous electrolyte. In this carbonaceous material, the sulfur content was 700 ppm, the oxygen content was 100 ppm, the nitrogen content was 100 ppm, and the content of each of Fe and Ni was 5 ppm.

COMPARATIVE EXAMPLE 3

The cylindrical lithium secondary battery shown in FIG. 1 was assembled following the same procedures as in Example 1 except that a carbonaceous material and a nonaqueous electrolyte described below were used.

First, mesophase spherulites were obtained from a mesophase pitch with a purity of an anisotropic pitch of 98 vol %, which was extracted from coal tar with a sulfur content of 8,000 ppm and a nitrogen content of 9,000 ppm. These mesophase spherulites were heat-treated in an argon gas atmosphere at 1,000° C., obtaining mesophase spherical carbons. Subsequently, these mesophase spherical carbons were graphitized in an argon gas atmosphere at 2,800° C., yielding a carbonaceous material.

The resultant carbonaceous material was a graphitized carbon powder with an average particle size of 6 μm, which was distributed at a ratio of 90 vol % within the range of 0.1 to 15 μm in a particle size distribution, and in which the ratio of particles with a particle size of 0.5 μm or less was 10 vol % in the particle size distribution. The carbonaceous material was found to have a specific surface area of 8 m²/g when measured by a BET method using N₂ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 3 below. Table 3 also shows the exothermic peak measured by a differential thermal analysis. In this carbonaceous material, the sulfur content was 700 ppm, the oxygen content was 300 ppm, the nitrogen content was 7,000 ppm, the Fe content was 580 ppm, and the Ni content was 8 ppm.

The nonaqueous electrolyte used had a composition in which lithium phosphate hexafluoride (LiPF₆) was dissolved in an amount of 1.0 mol/l in a solvent mixture (mixing volume ratio 50:50) of ethylene carbonate (EC) and diethyl carbonate (DEC). Note that the donor number of diethyl carbonate was 16.5. In this nonaqueous electrolyte, the content of H₂O was 100 ppm or less, and that of ethylene glycol was 100 ppm or less. Table 3 also shows the nonaqueous solvent contained in the nonaqueous electrolyte.

COMPARATIVE EXAMPLE 4

The cylindrical lithium secondary battery shown in FIG. 1 was assembled following the same procedures as in Example 1 except that a nonaqueous electrolyte described below and a carbonaceous material similar to that of Comparative Example 3 were used.

The nonaqueous electrolyte used had a composition in which lithium phosphate hexafluoride (LiPF₆) was dissolved in an amount of 1.0 mol/l in a solvent mixture (mixing volume ratio 50:50) of ethylene carbonate (EC) and dimethylsuloxide (DMSO). Note that the donor number of dimethylsuloxide was 29.8. In this nonaqueous electrolyte, the content of H₂O was 100 ppm or less, and that of ethylene glycol was 100 ppm or less. Table 3 also shows the nonaqueous solvent contained in the nonaqueous electrolyte.

COMPARATIVE EXAMPLE 5

The cylindrical lithium secondary battery shown in FIG. 1 was assembled following the same procedures as in Example 1 except that a nonaqueous electrolyte having a composition in which lithium phosphate hexafluoride (LiPF₆) was dissolved in an amount of 1.0 mol/l in ethylene carbonate (EC) and a carbonaceous material similar to that of Comparative Example 3 were used. Note that Table 3 also shows the nonaqueous solvent contained in the nonaqueous electrolyte.

COMPARATIVE EXAMPLE 6

The cylindrical lithium secondary battery shown in FIG. 1 was assembled following the same procedures as in Example 1 except that a nonaqueous electrolyte having a composition in which lithium phosphate hexafluoride (LiPF₆) was dissolved in an amount of 1.0 mol/l in a solvent mixture (mixing volume ratio 50:50) of ethylene carbonate (EC) and 1,2-dimethoxyethane (DME) and a carbonaceous material similar to that of Comparative Example 3 were used. Note that the donor number of 1,2-dimethoxyethane was 20. Table 3 also shows the nonaqueous solvent contained in the nonaqueous electrolyte.

COMPARATIVE EXAMPLE 7

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 95 vol % obtained from a petroleum pitch with a sulfur content of 10,000 ppm was spun into fibers, and these fibers were carbonized at 1,000° C., forming mesophase pitch carbon fibers. Subsequently, these carbon fibers were pulverized to yield a carbonaceous material.

The resultant carbonaceous material was a carbonized powder with an average particle size of 20 μm, which was distributed at a ratio of 90 vol % within the range of 1 to 80 μm in a particle size distribution, and in which the ratio of particles with a particle size of 0.5 μm or less was 5 vol % in the particle size distribution. The carbonaceous material was found to have a specific surface area of 4 m²/g when measured by a BET method using $N_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 3 below. Table 3 also shows the exothermic peak measured by a differential thermal analysis. In this carbonaceous material, the sulfur content was 2,300 ppm, the oxygen content was 600 ppm, the nitrogen content was 200 ppm, the content of each of Fe and Ni was 5 ppm.

which the ratio of particles with a particle size of 0.5 μm or less was 8 vol % in the particle size distribution. The carbonaceous material was found to have a specific surface area of 6 m²/g when measured by a BET method using $N_2$ gas adsorption.

Various parameters ($P_{101}/P_{100}$, $d_{002}$, Lc, and La) obtained by X-ray diffraction analysis were measured for the above carbonaceous material by using a half-width mid-point method. The results are summarized in Table 3 below. Table 3 also shows the exothermic peak measured by a differential thermal analysis. In this carbonaceous material, the contents of various elements were that sulfur; 1,100 ppm, oxygen; 300 ppm, nitrogen; 7,000 ppm, Fe; 580 ppm, Ni; 8 ppm, Si; 9 ppm, each of Al, Cr, V, Cu, and Ca; 1 ppm, and Zn; 17 ppm.

The nonaqueous electrolyte used had a composition in which lithium phosphate hexafluoride (LiPF$_6$) was dissolved in an amount of 1.0 mol/l in a solvent mixture (mixing volume ratio 50:50) of ethylene carbonate (EC) and propylene carbonate (PC). In this nonaqueous electrolyte, the content of $H_2O$ was 20 ppm or less, and that of ethylene glycol was 100 ppm or less. Table 3 also shows the nonaqueous solvent contained in the nonaqueous electrolyte.

TABLE 3

| Comparative example | Material | $P_{101}/P_{100}$ | Position of peak (°C.) measured by differential thermal analysis | $d_{002}$ (nm) | Lc (nm) | La (nm) | S content (ppm) | Nonaqueous solvent; Mixing ratio in parentheses |
|---|---|---|---|---|---|---|---|---|
| 1 | Mesophase globules | 2.3 | 820 | 0.3369 | 30 | 116 | 400 | EC/DEC (50/50) |
| 2 | Mesophase globules | 2.5 | 780 | 0.3355 | 43 | 59.8 | 700 | EC/DEC (50/50) |
| 3 | Mesophase globules | 0.65 | 750 | 0.339 | 18 | 60 | 1200 | EC/DEC (50/50) |
| 4 | Mesophase globules | 0.65 | 750 | 0.339 | 18 | 60 | 1200 | EC/DMSO (50/50) |
| 5 | Mesophase globules | 0.65 | 750 | 0.339 | 18 | 60 | 1200 | EC |
| 6 | Mesophase globules | 0.65 | 750 | 0.339 | 18 | 60 | 1200 | EC/DME (50/50) |
| 7 | Mesophase globules | 0 | 685 | 0.359 | 1.5 | — | 2300 | EC/DEC (50/50) |
| 8 | Mesophase globules | 0 | 680 | 0.355 | 2.0 | 3.9 | 1100 | EC/PC (50/50) |

The nonaqueous electrolyte used had a composition in which lithium phosphate hexafluoride (LiPF$_6$) was dissolved in an amount of 1.0 mol/l in a solvent mixture (mixing volume ratio 50:50) of ethylene carbonate and diethyl carbonate. Note that the donor number of diethyl carbonate was 16.5. In this nonaqueous electrolyte, the content of $H_2O$ was 100 ppm or less, and that of ethylene glycol was 100 ppm or less. Table 3 also shows the nonaqueous solvent contained in the nonaqueous electrolyte.

COMPARATIVE EXAMPLE 8

The cylindrical lithium secondary battery shown in FIG. 1 was assembled following the same procedures as in Example 1 except that a carbonaceous material and a nonaqueous electrolyte described below were used.

First, a mesophase pitch with a purity of an anisotropic pitch of 95 vol %, obtained from coal tar with a sulfur content of 8,000 ppm and a nitrogen content of 9,000 ppm, was carbonized at 1,000° C., forming mesophase spherical carbons.

The resultant carbonaceous material was a carbon powder with an average particle size of 5 μm, which was distributed at a ratio of 90 vol % within the range of 0.1 to 15 μm in a particle size distribution, and in

COMPARATIVE EXAMPLE 9

The cylindrical lithium secondary battery shown in FIG. 1 was assembled following the same procedures as in Example 18 except that a carbonaceous material described below was used.

Mesophase spherical carbons obtained from coal tar were carbonized in an argon gas atmosphere at 1,000° C. and then graphitized in an argon gas atmosphere at 2,800° C., yielding a graphitized carbonaceous material.

The resultant carbonaceous material was a graphitized powder with an average particle size of 6 μm, which was distributed at a ratio of 90 vol % within the range of 1 to 80 μm in a particle size distribution, and in which the ratio of particles with a particle size of 0.5 μm or less was 6 vol % in the particle size distribution. The carbonaceous material was found to have a specific surface area of 1.2 m²/g when measured by a BET method using $N_2$ gas adsorption.

Various parameters obtained by X-ray diffraction analysis were measured for the above carbonaceous material by using a half-width mid-point method. As a result, the value of $P_{101}/P_{100}$ was 2.6, $d_{002}$ was 0.337 nm, Lc was 58 nm, La was 239 nm, and La/Lc was 4.12. The values of $P_{101}/P_{100}$, $d_{002}$, Lc, La, and La/Lc obtained by X-ray diffraction analysis are summarized in Table 4 below. Table 4 also shows the exothermic peak measured by a differential thermal analysis, the nonaqueous solvent contained in the nonaqueous electrolyte used, and the sulfur content in the above carbonaceous material.

COMPARATIVE EXAMPLE 10

The cylindrical lithium secondary battery shown in FIG. 1 was assembled following the same procedures as in Example 18 except that a carbonaceous material described below was used.

An anisotropic pitch obtained from a coal pitch was spun into fibers, and these fibers were graphitized in an argon atmosphere at 2,800° C. and then pulverized, thereby yielding a carbonaceous material.

The resultant carbonaceous material had an average particle size of 85 μm, was distributed at a ratio of 90 vol % within the range of 1 to 80 μm in a particle size distribution, and had a ratio of particles, with a particle size of 0.5 μm or less, of 6 vol % in the particle size distribution. The carbonaceous material was found to have a specific surface area of 5 m$^2$/g when measured by a BET method using N$_2$ gas adsorption.

Various parameters obtained by X-ray diffraction analysis were measured for the above carbonaceous material by using a half-width mid-point method. As a result, the value of $P_{101}/P_{100}$ was 2.6, $d_{002}$ was 0.337 nm, Lc was 120 nm, La was 180 nm, and La/Lc was 1.5. The values of $P_{101}/P_{100}$, $d_{002}$, Lc, La, and La/Lc obtained by X-ray diffraction analysis are summarized in Table 4 below. Table 4 also shows the exothermic peak measured by a differential thermal analysis, the nonaqueous solvent contained in the nonaqueous electrolyte used, and the sulfur content in the above carbonaceous material.

the present invention, indicating good high-rate discharge characteristics.

Figure 4:
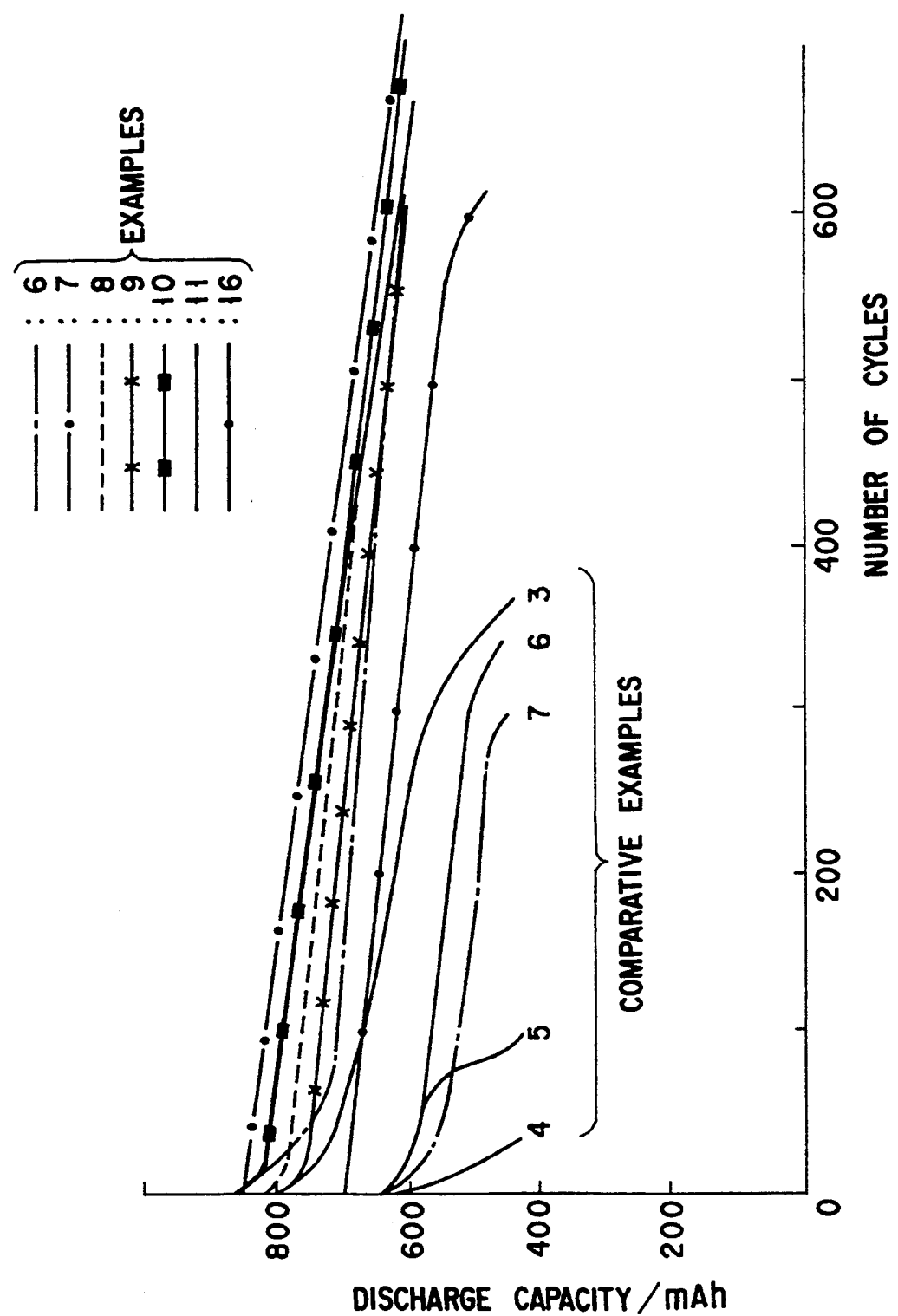
FIG. 4 is a graph showing the relationship between the charge-discharge cycle and the discharge capacity of a lithium secondary battery of each of Examples 6 to 11 and 16 and comparative Examples 4 to 7.

Furthermore, the lithium secondary batteries of Examples 6 to 11 and 16 and Comparative Examples 3 to 7 were repeatedly charged and discharged such that they were charged up to 4.2V at a charge current of 400 mA for three hours and then discharged down to 3.0V at a current of 400 mA, thereby measuring the discharge capacity and the cycle life of each battery. The results are shown in FIG. 4. As is apparent from FIG. 4, the lithium secondary batteries of Examples 6 to 11 and 16 had larger capacities and much longer cycle lives than those of the batteries of Comparative Examples 3 to 7.

Figure 5:
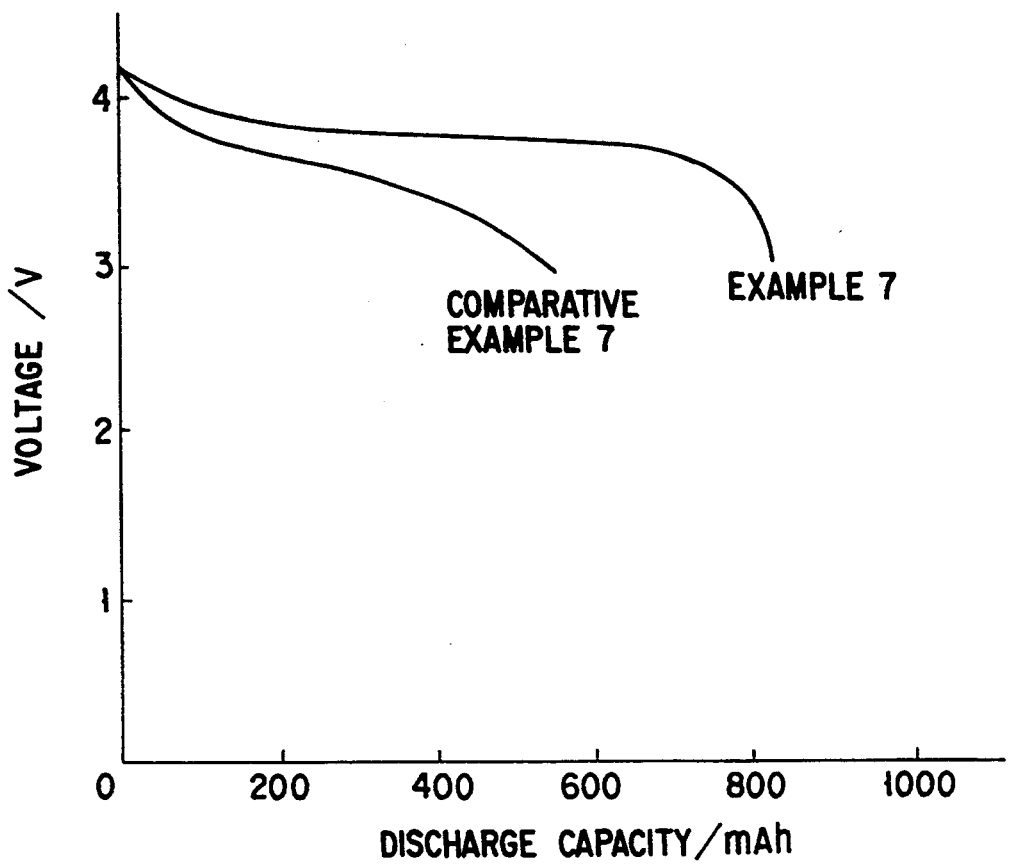
FIG. 5 is a graph showing the discharge curves of Example 7 and Comparative Example 7.

FIG. 5 shows the discharge curves of the lithium secondary batteries of Example 7 and Comparative Example 7.

As can be seen from FIG. 5, the lithium secondary battery of Example 7 could maintain a high voltage of 3.8V, i.e., was superior in flatness of a voltage to the battery of Comparative Example 7. Note that the lithium secondary batteries of Examples 1 to 6 and 8 to 11 could also maintain similar high voltages.

Figure 6:
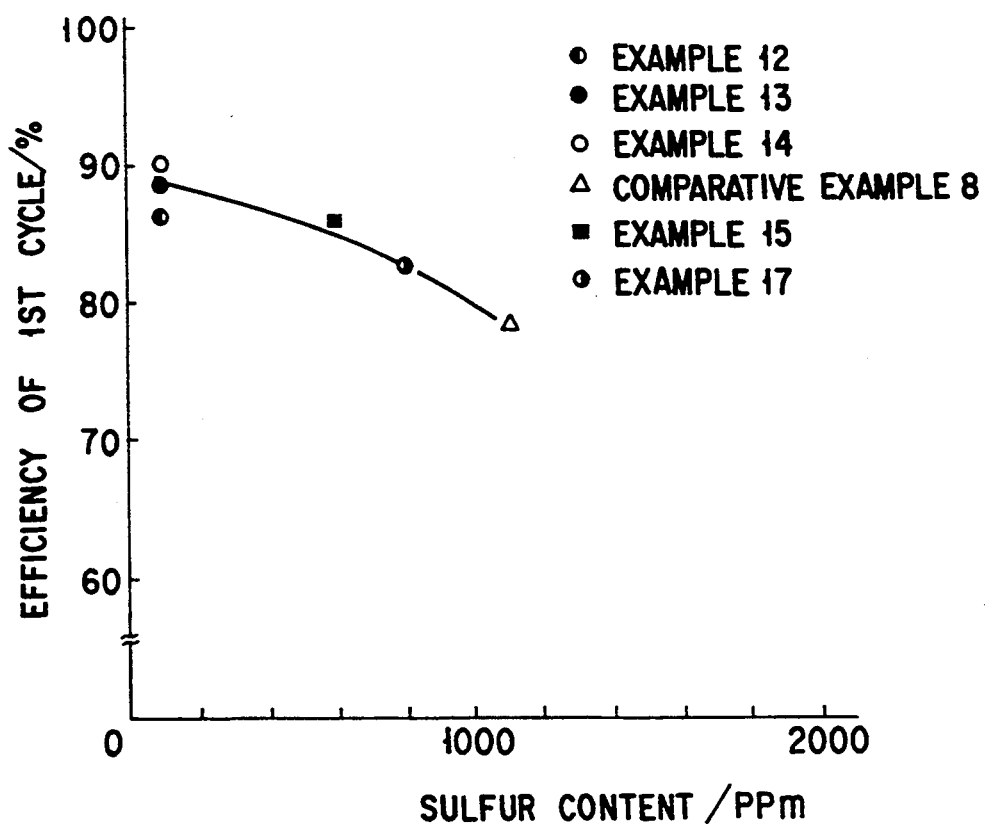
FIG. 6 is a graph showing the relationship between the charge-discharge efficiency in the first cycle and the sulfur content of a negative electrode of a lithium secondary battery of each of Examples 12 to 15 and 17 and Comparative Example 8.

The relationship between the charge-discharge efficiency in the first cycle and the sulfur content was checked for the lithium secondary batteries of Examples 12 to 15 and 17 and Comparative Example 8. The results are shown in FIG. 6.

In addition, the lithium secondary batteries of Examples 18 and 19 and Comparative Examples 9 and 10 were repeatedly charged and discharged such that they were charged up to 4.2V at a charge current of 400 mA for three hours and then discharged down to 2.7V at a high-rate current of 1 A, thereby measuring the discharge capacity and the cycle life of each battery. The results are shown in FIG. 7.

Figure 7:
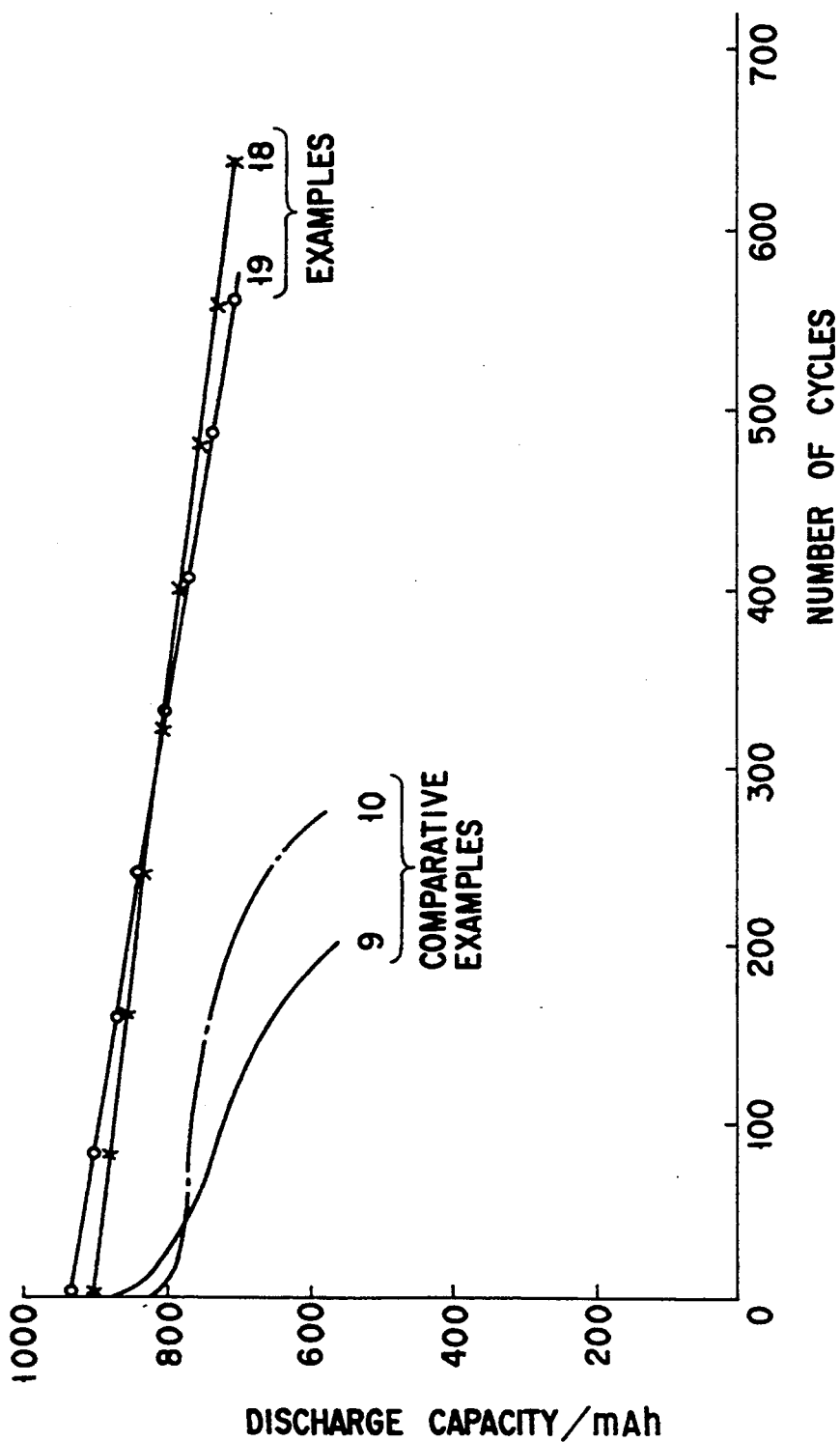
FIG. 7 is a graph showing the relationship between the charge-discharge cycle and the discharge capacity of a lithium secondary battery of each of Examples 18 and 19 and Comparative Examples 9 and 10.

As is apparent from FIG. 7, the lithium secondary batteries of Examples 18 and 19 had larger capacities and much longer cycle lives than those of the batteries

TABLE 4

| Comparative example | Material | $P_{101}/P_{100}$ | Position of peak (°C.) measured by differential thermal analysis | $d_{002}$ (nm) | Lc (nm) | La (nm) | La/Lc | S content (ppm) | Nonaqueous solvent; Mixing ratio in parentheses |
|---|---|---|---|---|---|---|---|---|---|
| 9 | Mesophase globules | 2.6 | 814 | 0.3370 | 58 | 239 | 4.12 | 100 | EC/PC/DEC (40/30/30) |
| 10 | Anisotropic pitch fiberles | 2.6 | 810 | 0.3370 | 120 | 180 | 1.5 | 100 | EC/PC/DEC (40/30/30) |

The lithium secondary batteries of Examples 1 to 5 and Comparative Examples 1 and 2 were repeatedly charged and discharged such that they were charged up to 4.2V at a charge current of 400 mA for three hours and then discharged down to 3.0V at a current of 400 mA, thereby measuring the discharge capacity and the cycle life of each battery. The results are shown in FIG. 2.

Figure 2:
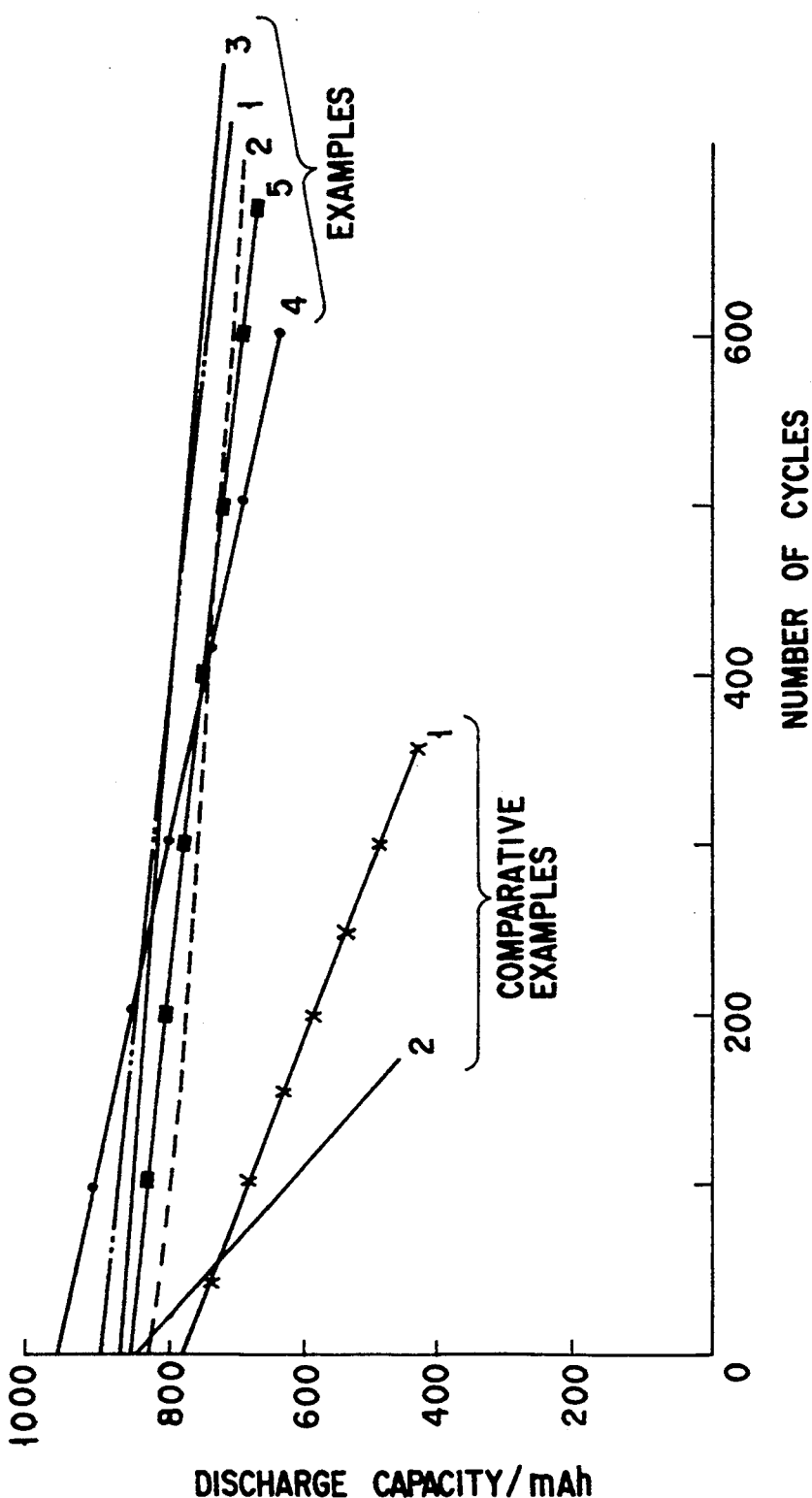
FIG. 2 is a graph showing the relationship between the charge-discharge cycle and the discharge capacity of a lithium secondary battery of each of Examples 1 to 5 and Comparative Examples 1 and 2.

As can be seen from FIG. 2, the lithium secondary batteries of Examples 1 to 5 had larger capacities and much longer cycle lives than those of the batteries of Comparative Examples 1 and 2 even at the high discharge rate.

Figure 3:
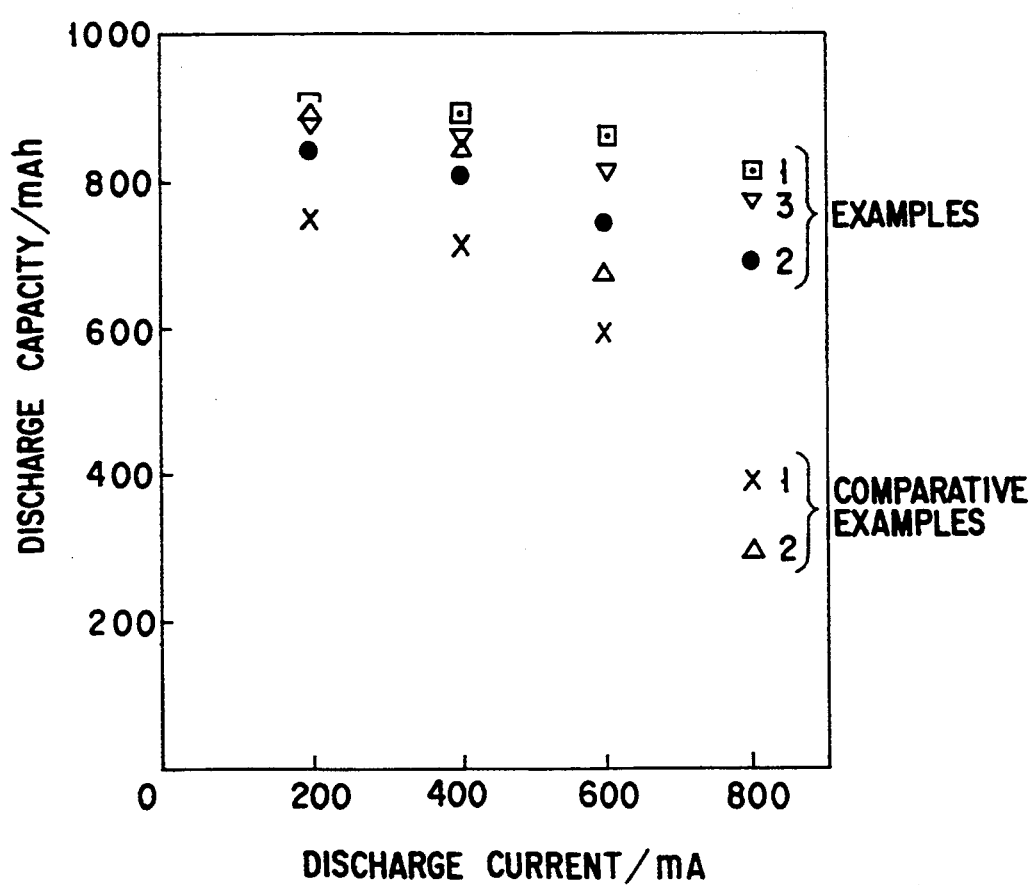
FIG. 3 is a graph showing the relationship between the charge current and the discharge current of a lithium secondary battery of each of Examples 1 to 3 and Comparative Examples 1 and 2.

In addition, the discharge capacity of the lithium secondary battery of each of Examples 1 to 3 and Comparative Examples 1 and 2 was measured at charge currents of 100 to 800 mA. The results are shown in FIG. 3. FIG. 3 reveals that the decrease in discharge capacity was low in each lithium secondary battery of of Comparative Examples 9 and 10 even at the high discharge rate.

Note that the lithium secondary battery of Example 19 presented similar cycle characteristics in the charge-discharge cycle tests at 60° C. and room temperature, indicating a startling effect derived from the use of LiN(CF$_3$SO$_2$)$_2$ as an electrolytic salt.

EXAMPLE 20

First, a mesophase with a purity of an anisotropic pitch of 100% obtained from a petroleum pitch was spun into short fibers, and these short fibers were carbonized through a heat treatment in an argon atmosphere at 1,000° C., forming mesophase pitch carbon fibers. These mesophase pitch carbon fibers were found to have $d_{002}$ of 0.360 run, when measured by X-ray diffraction analysis, and an average fiber diameter of 12 μm. Subsequently, the carbon fibers thus obtained were properly pulverized such that the final carbonaceous material was distributed at a ratio of 90 vol % within the range of 0.5 to 80 μm in a fiber length distribution. Thereafter, the carbon fibers thus pulverized were graphitized in an argon atmosphere at 3,000° C., yielding a carbonaceous material.

The resultant carbonaceous material was a graphitized carbon powder with an average fiber diameter of 11 μm, which was distributed at a ratio of 90 vol % within the range of 1 to 80 μm in a fiber length distribution. The carbonaceous material was found to have a specific surface area of 8 m$^2$/g when measured by a BET method using N$_2$ gas adsorption.

Various parameters obtained by X-ray diffraction analysis were measured for the above carbonaceous material by using a half-width mid-point method. As a result, $d_{002}$ was 0.3375 nm, Lc was 21 nm, La was 40 nm, and the value of $P_{101}/P_{100}$ was 1.0. The exothermic peak measured by a diffraction thermal analysis in the air was 870° C. In this carbonaceous material, the sulfur content was 100 ppm or less, the oxygen content was 100 ppm or less, the nitrogen content was 100 ppm or less, and the content of each of Fe and Ni was 1 ppm.

Subsequently, 96.7 wt % of the above carbonaceous material were mixed with 2.2 wt % of styrenebutadiene rubber and 1.1 wt % of carboxymethylcellulose to prepare a mixture, and equal quantities of the mixture thus prepared were coated on both the surfaces of a 10 μm thick copper foil as a collector, manufacturing a negative electrode. The thickness of the negative electrode except the collector was 180 μm, and the weight of the mixture coated on one surface of the collector constituting the negative electrode was 140 g/m$^2$. The bulk density of the negative electrode was 1.56 g/cm$^2$.

Separately, toluene was added to 91 wt % of a lithium-cobalt oxide (LiCoO$_2$) powder, as a positive electrode active material, 3.5 wt % of acetylene black, 3.5 wt % of graphite, and 2 wt % of an ethylenepropylenediene monomer powder, and the resultant material was mixed sufficiently to prepare a mixture. Thereafter, equal quantities of the mixture thus prepared were coated on both the surfaces of a 30 μm thick aluminum foil as a collector, and the resultant structure was pressed to manufacture a positive electrode. The thickness of the positive electrode except the collector was 270 μm, and the weight per unit area of the mixture coated on one surface of the collector was 378 g/m$^2$.

The ratio, therefore, of the thickness of the positive electrode except the collector to that of the negative electrode except the collector was 1.33:1, and the ratio of the weight per unit area of the positive electrode to that of the negative electrode was 2.7:1.

The positive electrode, a separator consisting of a polypropylene porous film, and the negative electrode were stacked in this order, and the resultant structure was spirally wound such that the negative electrode was located outside, manufacturing an electrode group.

Separately, lithium phosphate hexafluoride (LiPF$_6$) was dissolved in an amount of 1.0 mol/l in a solvent mixture (mixing volume ratio 1:1:1) of ethylene carbonate (EC), polypropylene carbonate (PC), and diethyl carbonate (DEC), preparing a nonaqueous electrolyte. Note that the donor number of DEC was 16, and the amount of H$_2$O contained in this nonaqueous electrolyte was 20 ppm.

The electrode group and the nonaqueous electrolyte were placed in a cylindrical case having a bottom and consisting of stainless steel, thereby assembling the cylindrical lithium secondary battery shown in FIG. 1.

Table 5 below shows $d_{002}$, Lc, La, $P_{101}/P_{100}$, the differential exothermic peak temperature, the thickness ratio of the positive and negative electrodes, the weight ratio of the positive and negative electrodes, the material of the positive electrode, the bulk density of the negative electrode, and the amount of the nonaqueous electrolyte was 3.85 cm$^3$.

EXAMPLE 21

The cylindrical lithium secondary battery shown in FIG. 1 was assembled following the same procedures as in Example 20 except that positive and negative electrodes having thicknesses and weights described below were used.

The thickness of the positive electrode except a collector was 245 μm, and the weight per unit area of a mixture coated on one surface of the collector was 340 g/m$^2$.

The thickness of the negative electrode except a collector was 220 μm, and the weight per unit area of a mixture coated on one surface of the collector was 150 g/m$^2$. The bulk density of the negative electrode was 1.43 g/m$^3$.

The ratio, therefore, of the thickness of the positive electrode except the collector to that of the negative electrode except the collector was 1.02:1, and the ratio of the weight per unit area of the positive electrode to that of the negative electrode was 2.27:1. Note that the amount of the nonaqueous electrolyte used was 4.0 cm$^3$.

EXAMPLE 22

The cylindrical lithium secondary battery shown in FIG. 1 was assembled following the same procedures as in Example 20 except that lithium-nickel oxide (LiNiO$_2$) was used as an active material of a positive electrode and LiN(CF$_3$SO$_2$)$_2$ was used as an electrolytic salt of a nonaqueous electrolyte. Note that the amount of the nonaqueous electrolyte was 4.0 cm$^3$.

EXAMPLE 23

The cylindrical lithium secondary battery shown in FIG. 1 was assembled following the same procedures as in Example 20 except that lithium-manganese oxide (LiMn$_2$O$_4$) was used as an active material of a positive electrode and positive and negative electrodes having thicknesses and weights described below were used.

The thickness of the positive electrode except a collector was 290 μm, and the weight per unit area of a mixture coated on one surface of the collector was 390 g/m$^2$.

The thickness of the negative electrode except a collector was 175 μm, and the weight per unit area of a mixture coated on one surface of the collector was 132 g/m$^2$. The bulk density of the negative electrode was 1.60 g/m$^3$.

The ratio, therefore, of the thickness of the positive electrode except the collector to that of the negative electrode except the collector was 1.58:1, and the ratio of the weight per unit area of the positive electrode to that of the negative electrode was 2.95:1. Note that the amount of the nonaqueous electrolyte used was 3.6 cm$^3$.

EXAMPLE 24

The cylindrical lithium secondary battery shown in FIG. 1 was assembled following the same procedures as in Example 20 except that a carbonaceous material described below was used.

Mesophase spherical carbons from which a portion of the surface layer corresponding to 15 wt % was removed by oxidation in the air were graphitized at 2,800° C., yielding a carbonaceous material.

Various parameters ($d_{002}$, Lc, La, and $P_{101}/P_{100}$) obtained by X-ray diffraction analysis were measured for the above carbonaceous material by using a half-width mid-point method. As a result, $d_{002}$ was 0.3359 nm, Lc was 37 nm, La was 66 nm, and $P_{101}/P_{100}$ was 2.15. The differential exothermic peak was 800° C., and the sulfur content was 100 ppm. Note that the amount of the nonaqueous electrolyte used was 4 cm$^3$.

EXAMPLE 25

The cylindrical lithium secondary battery shown in FIG. 1 was assembled following the same procedures as in Example 20 except that a positive electrode active material similar to that of Example 23, and a carbonaceous material described below, and positive and negative electrodes having thicknesses and weights described below were used.

First, a mesophase pitch with a purity of 100% obtained from a petroleum pitch was spun into short fibers, and these short fibers were carbonized through a heat treatment in an argon atmosphere at 1,000° C., forming mesophase pitch carbon fibers ($d_{002}$=0.355 nm). These mesophase pitch carbon fibers were found to have an average fiber diameter of 17 μm. Subsequently, the carbon fibers thus obtained were properly pulverized such that the final carbonaceous material was distributed at a ratio of 90 vol % within the range of 0.5 to 60 μm in a fiber length distribution. Thereafter, the carbon fibers thus pulverized were graphitized in an argon atmosphere at 3,000° C., yielding a carbonaceous material.

The resultant carbonaceous material was a graphitized carbon powder with an average fiber diameter of 16 μm, which was distributed at a ratio of 90 vol % within the range of 0.5 to 60 μm in a fiber length distribution. The carbonaceous material was found to have a specific surface area of 4 m$^2$/g when measured by a BET method using N$_2$ gas adsorption.

Various parameters obtained by X-ray diffraction analysis were measured for the above carbonaceous material by using a half-width mid-point method. As a result, $d_{002}$ was 0.3368 nm, Lc was 21 nm, La was 28 nm, and the value of $P_{101}/P_{100}$ was 1.1. The exothermic peak measured by a diffraction thermal analysis in the air was 840° C. In the carbonaceous material, the sulfur content was 100 ppm or less, the oxygen content was 100 ppm or less, the nitrogen content was 100 ppm or less, and the content of each of Fe and Ni was 1 ppm.

The thickness of the positive electrode used, except for a collector, was 275 μm, and the weight per unit area of a mixture coated on one surface of the collector was 389 g/m$^2$.

The thickness of the negative electrode used, except for a collector, was 190 μm, and the weight per unit area of a mixture coated on one surface of the collector was 140 g/m$^2$. The bulk density of the negative electrode was 1.56 g/cm$^2$.

The ratio, therefore, of the thickness of the positive electrode except the collector to that of the negative electrode except the collector was 1.36:1, and the ratio of the weight per unit area of the positive electrode to that of the negative electrode was 2.75:1. The amount of the nonaqueous electrolytic used was 3.85 cm$^3$.

EXAMPLE 26

The cylindrical lithium secondary battery shown in FIG. 1 was assembled following the same procedures as in Example 20 except that positive and negative electrodes having thicknesses and weights similar to those of Example 21 and a carbonaceous material described below were used.

First, coke obtained from a low-sulfur petroleum pitch (sulfur content=8,000 ppm or less) was carbonized in an argon atmosphere at 1,000° C. and then properly pulverized such that the final carbonaceous material had an average particle size of 40 μm and was distributed at a ratio of 90 vol % within the range of 1 to 80 μm as a particle size, and that particles with a particle size of 0.5 μm or less were reduced (to 5 vol % or less). Thereafter, the resultant material was graphitized in an argon atmosphere at 3,000° C., yielding a carbonaceous material.

The resultant carbonaceous material was a graphitized carbon powder with an average particle size of 40 μm, which was distributed at a ratio of 90 vol % within the range of 1 to 80 μm in a particle size distribution, and in which the ratio of particles with a particle size of 0.5 μm or less was 0 vol % in the particle size distribution. The carbonaceous material was found to have a specific surface area of 3 m$^2$/g when measured by a BET method using N$_2$ gas adsorption. The shape of the powder was a particle. When X-ray diffraction analysis was performed, $d_{002}$ was 0.3354 nm, Lc was 43 nm, La was 43 nm, and La/Lc was 1. The value of an intensity ratio $P_{101}/P_{100}$ was 3.6. Note that the ratio of a (101) diffraction peak of a rhomboidal system to that of a hexagonal system, obtained by X-ray diffraction analysis, was 0.4. In this carbonaceous material, the sulfur content was 100 ppm or less, the oxygen content was 100 ppm or less, the nitrogen content was 100 ppm or less, and the content of each of Fe and Ni was 1 ppm.

Note that the amount of the nonaqueous electrolyte used was 4.2 cm$^3$.

EXAMPLE 27

The cylindrical lithium secondary battery shown in FIG. 1 was assembled following the same procedures as in Example 20 except that positive and negative electrodes having thicknesses and weights similar to those of Example 21 and a carbonaceous material described below were used.

First, coke obtained from a low-sulfur petroleum pitch (sulfur content=8,000 ppm or less) was carbonized in an argon atmosphere at 1,000° C. and then properly pulverized such that the final carbonaceous material had an average particle size of 40 μm and was distributed at a ratio of 90 vol % within the range of 1 to 80 μm as a particle size, and that particles with a particle size of 0.5 μm or less were reduced (to 5 vol % or less). Thereafter, the resultant material was graphitized in an argon atmosphere at 2,600° C., yielding a carbonaceous material.

The resultant carbonaceous material was a graphitized carbon powder with an average particle size of 40 μm, which was distributed at a ratio of 90 vol % within the range of 1 to 80 μm in a particle size distribution, and in which the ratio of particles with a particle size of 0.5 μm or less was 0 vol % in the particle size distribution. The carbonaceous material was found to have a specific surface area of 3 m$^2$/g when measured by a BET method using N$_2$ gas adsorption. The shape of the powder was a particle. When X-ray diffraction analysis was performed, $d_{002}$ was 0.3390 nm, Lc was 18 nm, La was 30 nm, and La/Lc was 1.67. The value of an intensity ratio $P_{101}/P_{100}$ was 0.75. In this carbonaceous material, the sulfur content was 500 ppm or less, the oxygen content was 200 ppm or less, the nitrogen content was 100 ppm or less, and the content of each of Fe and Ni was 20 ppm.

Note that the amount of the nonaqueous electrolye used was 4.3 cm$^3$.

COMPARATIVE EXAMPLE 11

The cylindrical lithium secondary battery shown in FIG. 1 was assembled following the same procedures as in Example 20 except that a carbonaceous material described below and positive and negative electrodes having thicknesses and weights described below were used.

As a carbonaceous material, a petroleum pitch and coke carbonized at 1,400° C. were used. When X-ray diffraction analysis was performed, this carbonaceous material was found to have $P_{101}/P_{100}$ of 0, $d_{002}$ of 0.350 nm, and Lc of 1.5 nm. The differential exothermic peak was 703° C., and the sulfur content was 1,200 ppm.

The thickness of the positive electrode used, except for a collector, was 200 μm, and the weight per unit area of a mixture coated on one surface of the collector was 265 g/m$^2$.

The thickness of the negative electrode used, except for a collector, was 260 μm, and the weight per unit area of a mixture coated on one surface of the collector was 150 g/m$^2$. The bulk density of the negative electrode was 1.25 g/m$^3$.

The ratio, therefore, of the thickness of the positive electrode except the collector to that of the negative electrode except the collector was 0.68:1, and the ratio of the weight per unit area of the positive electrode to that of the negative electrode was 1.77:1. Note that the amount of the nonaqueous electrolyte used was 5 cm$^3$.

COMPARATIVE EXAMPLE 12

The cylindrical lithium secondary battery shown in FIG. 1 was assembled following the same procedures as in Example 20 except that an active material of a positive electrode similar to that of Example 24 and positive and negative electrodes having thicknesses and weights described below were used.

The thickness of the positive electrode used, except for a collector, was 320 μm, and the weight per unit area of a mixture coated on one surface of the collector was 420 g/m$^2$.

The thickness of the negative electrode used, except for a collector, was 140 μm, and the weight per unit area of a mixture coated on one surface of the collector was 100 g/m$^2$. The bulk density of the negative electrode was 1.33 g/m$^3$.

The ratio, therefore, of the thickness of the positive electrode except the collector to that of the negative electrode except the collector was 2.23:1, and the ratio of the weight per unit area of the positive electrode to that of the negative electrode was 4.2:1. Note that the amount of the nonaqueous electrolyte used was 2 cm$^3$.

COMPARATIVE EXAMPLE 13

The cylindrical lithium secondary battery shown in FIG. 1 was assembled following the same procedures as in Example 20 except that positive and negative electrodes having thicknesses and weights described below were used.

The thickness of the positive electrode used, except for a collector, was 220 μm, and the weight per unit area of a mixture coated on one surface of the collector was 290 g/m$^2$.

The thickness of the negative electrode used, except for a collector, was 240 μm, and the weight per unit area of a mixture coated on one surface of the collector was 170 g/m$^2$. The bulk density of the negative electrode was 1.48 g/m$^3$.

The ratio, therefore, of the thickness of the positive electrode except the collector to that of the negative electrode except the collector was 0.83:1, and the ratio of the weight per unit area of the positive electrode to that of the negative electrode was 0.83:1. Note that the amount of the nonaqueous electrolyte used was 5 cm$^3$.

COMPARATIVE EXAMPLE 14

The cylindrical lithium secondary battery shown in FIG. 1 was assembled following the same procedures as in Example 20 except that a carbonaceous material described below and positive and negative electrodes having thicknesses and weights similar to those of Example 21 were used.

First, a mesophase pitch with a purity of 100% obtained from a petroleum pitch was spun into short fibers, and these short fibers were graphitized through a heat treatment in an argon atmosphere at 2,800° C., forming mesophase pitch carbon fibers. These mesophase pitch carbon fibers were found to have $d_{002}$ of 0.339 nm, Lc of 18 nm, La of 30 nm, and $P_{101}/P_{100}$ of 0.6. Subsequently, the carbon fibers thus obtained were pulverized to yield a carbonaceous material which had an average fiber length of 150 μm and was distributed at a ratio of 20 vol % within the range of 0.5 to 100 μm in a fiber length distribution. This carbonaceous material was found to have a specific surface area of 1.2 m$^2$/g when measured by a BET method using N$_2$ gas adsorption. Note that the negative electrode used, except for a collector, had a weight of 120 g/m$^2$ for one surface, a thickness of 190 μm, and a bulk density of 1.33 g/cm$^3$. In addition, the amount of the nonaqueous electrolyte used was 4.5 cm$^3$.

TABLE 5

| | Carbonaceous material of negative electrode | $d_{002}$ (nm) | Lc (nm) | La (nm) | $P_{101}/P_{100}$ | Differential exothermic peak (°C.) | Thickness ratio of positive electrode to negative electrode | Weight ratio of positive electrode to negative electrode | Material of positive electrode | Bulk density (g/cm$^3$) of negative electrode |
|---|---|---|---|---|---|---|---|---|---|---|
| Example 20 | Mesophase pitch carbon fibers | 0.3375 | 21 | 40 | 1.0 | 870 | 1.33:1 | 2.7:1 | LiCoO$_2$ | 1.56 |
| Example 21 | Mesophase pitch carbon fibers | 0.3375 | 21 | 40 | 1.0 | 870 | 1.02:1 | 2.27:1 | LiCoO$_2$ | 1.43 |
| Example 22 | Mesophase pitch carbon fibers | 0.3375 | 21 | 40 | 1.0 | 870 | 1.02:1 | 2.27:1 | LiNiO$_2$ | 1.43 |
| Example 23 | Mesophase pitch | 0.3375 | 21 | 40 | 1.0 | 870 | 1.58:1 | 2.95:1 | LiMn$_2$O$_4$ | 1.60 |

TABLE 5-continued

| | Carbonaceous material of negative electrode | $d_{002}$ (nm) | Lc (nm) | La (nm) | $P_{101}/P_{100}$ | Differential exothermic peak (°C.) | Thickness ratio of positive electrode to negative electrode | Weight ratio of positive electrode to negative electrode | Material of positive electrode | Bulk density (g/cm$^3$) of negative electrode |
|---|---|---|---|---|---|---|---|---|---|---|
| Example 24 | carbon fibers Mesophase pitch globules | 0.3359 | 37 | 66 | 2.15 | 800 | 1.33:1 | 2.7:1 | LiCoO$_2$ | 1.56 |
| Example 25 | Mesophase pitch carbon fibers | 0.3368 | 21 | 28 | 1.1 | 840 | 1.36:1 | 2.75:1 | LiCoO$_2$ | 1.56 |
| Example 26 | Artificial graphite | 0.3354 | 43 | 43 | 3.6 | 790 | 1.02:1 | 2.27:1 | LiCoO$_2$ | 1.43 |
| Example 27 | Petroleum pitch coke | 0.3390 | 18 | 30 | 0.75 | 780 | 1.02:1 | 2.27:1 | LiCoO$_2$ | 1.43 |
| Comparative example 11 | Petroleum pitch coke | 0.350 | 45 | — | 0 | 705 | 0.68:1 | 1.77:1 | LiCoO$_2$ | 1.25 |
| Comparative example 12 | Mesophase pitch globules | 0.3359 | 37 | 66 | 2.15 | 800 | 2.23:1 | 4.2:1 | LiCoO$_2$ | 1.33 |
| Comparative example 13 | Mesophase pitch carbon fibers | 0.3375 | 21 | 40 | 1.0 | 870 | 0.83:1 | 1.71:1 | LiCoO$_2$ | 1.48 |
| Comparative example 14 | Mesophase pitch carbon fibers | 0.339 | 18 | 30 | 0.6 | 800 | 1.33:1 | 3.15:1 | LiCoO$_2$ | 1.83 |

The lithium secondary batteries of Examples 20 to 27 and Comparative Examples 11 to 14 were repeatedly charged and discharged at room temperature such that they were charged up to 4.2V at a charge current of 400 mA for three hours and then discharged down to 3.0V at a current of 400 mA, thereby measuring the discharge capacity and the cycle life of each battery. The results are shown in FIG. 8.

Figure 8:
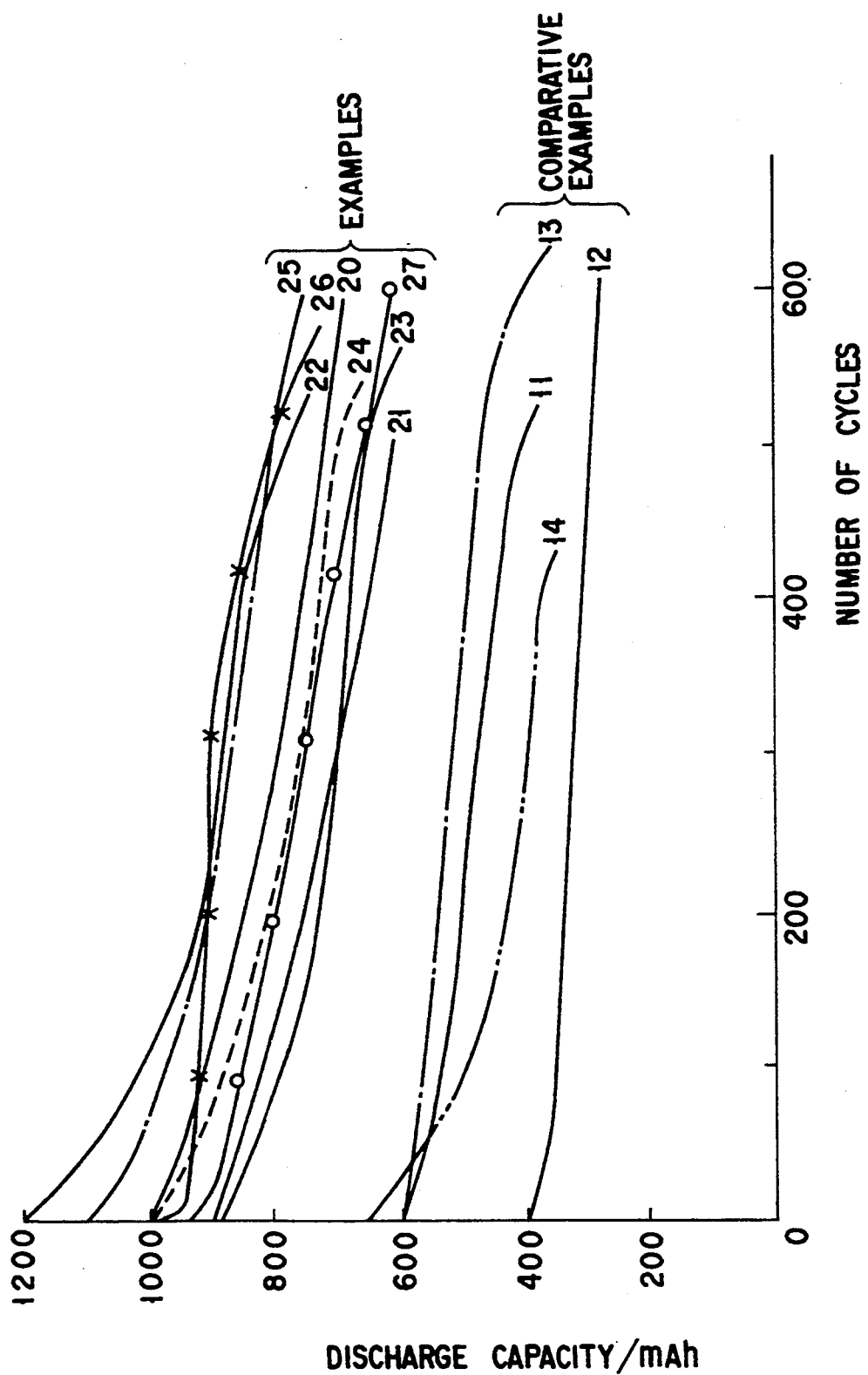
FIG. 8 is a graph showing the relationship between the charge-discharge cycle and the discharge capacity of a lithium secondary battery of each of Examples 20 to 27 and Comparative Examples 11 to 14.

As can be seen from FIG. 8, the lithium secondary batteries of Examples 20 to 27 had larger capacities and much longer cycle lives than those of the batteries of Comparative Examples 11 to 14.

In addition, the same cycle characteristic test as in Example 1 was performed for the lithium secondary battery of Example 22 at a battery operating temperature of 60° C., measuring the cycle life of the battery. As a result, the capacity after the operation of 300 cycles was approximately 80% that of the battery operated the same number of cycles at room temperature. For comparison, a battery was manufactured following the same procedures as in Example 22 except that LiPF$_6$ was used as an electrolytic salt, and was subjected to the same cycle tests at room temperature and 60° C. The result was that the capacity after the operation of 300 cycles at 60° C. was about 50% that of the battery operated the same number of cycles at room temperature.

Note that EC/PC/DEC (1:1:1) was used as the nonaqueous solvent for the nonaqueous electrolyte in each of Examples 20 to 27, but high capacities and long lives could be obtained as in Examples 20 to 27 even by the use of any solvent mixture of EC/DEC (1:1), EC/γ-BL (1:1), EC/γ-BL/DEC (2:1:1), and EC/PC (1:1). In addition, high capacities and long lives could be similarly obtained even when 5 vol % of toluene or m-xylene were added in order to reduce the viscosity of the nonaqueous electrolyte.

As has been described above, according to the present invention, there is provided a lithium secondary battery having a high capacity and excellent in charge-discharge efficiency, a cycle life, flatness of discharge voltage, and rapid charge-discharge cycle characteristics.

In addition, according to the present invention, there is also provided a method of manufacturing a negative electrode carbonaceous material suitable for the above-mentioned lithium secondary battery having superior characteristics.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A lithium secondary battery comprising:
    a positive electrode housed in a case;
    a negative electrode housed in said case and containing a carbonaceous material which has an exothermic peak at not less than 700° C. when measured by a differential thermal analysis, and an intensity ratio $P_{101}/P_{100}$ of a (101) diffraction peak $P_{101}$ to a (100) diffraction peak $P_{100}$ of a graphite structure, obtained by X-ray diffraction analysis, of 0.7 to 2.2, and absorbs and desorbs lithium ions;
    a separator housed in said case so as to be arranged between said positive and negative electrodes; and
    a nonaqueous electrolyte contained in said case.

2. The secondary battery according to claim 1, wherein said carbonaceous material has an interplanar distance ($d_{002}$) of (002) planes of a graphite structure, obtained by X-ray diffraction analysis, 0.336 to 0.338 nm, a ratio La/Lc of a length La in an a-axis direction to a length Lc in a c-axis direction of 1.3 to 2.5, and a length La in the a-axis direction of not more than 100 nm.

3. The secondary battery according to claim 1, wherein said carbonaceous material consists of fibrous powders which are distributed at a ratio of not less than 90 vol % within the range of a length of 0.5 to 100 μm and have an average diameter of 1 to 30 μm.

4. The secondary battery according to claim 1, wherein said carbonaceous material consists of spherical particles which are distributed at a ratio of not less than 90 vol % within the range of a particle size of 1 to 100 μm and have an average particle size of 1 to 80 μm.

5. The secondary battery according to claim 1, wherein said carbonaceous material has an exothermic peak at not less than 800° C. when measured by a differential thermal analysis, and an intensity ratio $P_{101}/P_{100}$ of a (101) diffraction peak $P_{101}$ to a (100) diffraction peak $P_{100}$ of a graphite structure, obtained by X-ray diffraction analysis, of 0.8 to 1.8.

6. The secondary battery according to claim 1, wherein said nonaqueous electrolyte consists of a solvent mixture containing ethylene carbonate and at least one nonaqueous solvent, which has a melting point lower than the melting point of ethylene carbonate and a donor number of not more than 18, and a lithium salt dissolved in said solvent mixture.

7. The secondary battery according to claim 6, wherein said nonaqueous solvent having a donor number of not more than 18 is at least one material selected from the group consisting of dimethyl carbonate, diethyl carbonate, propylene carbonate, γ-butyrolactone, acetonitrile, nitromethane, nitrobenzene, ethyl acetate, toluene, xylene, and methyl acetate.

8. The secondary battery according to claim 6, wherein said lithium salt is at least one material selected from the group consisting of lithium perchlorate ($LiClO_4$), lithium phosphate hexafluoride ($LiPF_6$), lithium borofluoride ($LiBF_4$), arsenolithium hexafluoride ($LiAsF_6$), lithium trifluoromethansulfonate ($LiCF_3SO_3$), and lithium bisfluoromethylsulfonylimide ($LiN(CF_3SO_2)_2$).

9. The secondary battery according to claim 6, wherein said lithium salt is dissolved within the range of 0.5 to 2.0 mols/l in said solvent mixture.

10. A lithium secondary battery comprising:
a positive electrode housed in a case and containing, as an active material, a lithium metal compound which includes at least one metal selected from the group consisting of cobalt, nickel, manganese, vanadium, titanium, molybdenum, and iron;
a negative electrode housed in said case and containing a carbonaceous material which has an interplanar distance $d_{002}$ of (002) planes of a graphite structure, obtained by X-ray diffraction analysis, of not more than 0.340 nm, and absorbs and desorbs lithium ions;
a separator housed in said case so as to be arranged between said positive and negative electrodes; and
a nonaqueous electrolyte contained in said case,
wherein a ratio of a thickness of said positive electrode to a thickness of said negative electrode is 2:1 to 0.9:1, and a ratio of a weight per unit area of said positive electrode to a weight per unit volume of said negative electrode is 4:1 to 2:1.

11. The secondary battery according to claim 10, wherein said lithium metal compound is at least one material selected from the group consisting of lithium-cobalt oxide, lithium-nickel oxide, and lithium-manganese oxide.

12. The secondary battery according to claim 10, wherein said positive electrode comprises a metal foil having a thickness of 10 to 40 μm and consisting of aluminum, stainless steel, or nickel, as a collector for holding said active material.

13. The secondary battery according to claim 10, wherein said carbonaceous material has an exothermic peak at not less than 700° C. when measured by a differential thermal analysis and an intensity ratio $P_{101}/P_{100}$ of a (100) diffraction peak $P_{101}$ to a (100) diffraction peak $P_{100}$ of a graphite structure, obtained by X-ray diffraction analysis, of 0.7 to 2.2.

14. The secondary battery according to claim 10, wherein said negative electrode comprises a metal foil having a thickness of 5 to 30 μm and consisting of copper, stainless steel, or nickel, as a collector for holding said carbonaceous material.

15. The secondary battery according to claim 10, wherein said nonaqueous electrolyte has a composition in which a lithium salt is dissolved in a nonaqueous solvent.

16. A lithium secondary battery comprising:
a positive electrode housed in a case;
a negative electrode housed in said case and containing a carbonaceous material which has an exothermic peak at not less than 700° C. when measure by a differential thermal analysis, and a sulfur content of not more than 1,000 ppm, and absorbs and desorbs lithium ions;
a separator housed in said case so as to be arranged between said positive and negative electrodes; and
a nonaqueous electrolyte contained in said case and consisting of a solvent mixture containing ethylene carbonate and at least one nonaqueous solvent, which has a melting point lower than the melting point of ethylene carbonate and a donor number of not more than 18, and a lithium salt dissolved in said solvent mixture.

17. The secondary battery according to claim 16, wherein said carbonaceous material has an average La of a crystallite in an a-axis direction of a graphite structure, which is derived from a diffraction peak of a (110) plane obtained by X-ray diffraction analysis, of 20 to 100 nm.

18. The secondary battery according to claim 16, wherein said carbonaceous material has a content of each metal element of 0 to 50 ppm, a silicon content of 0 to 50 ppm, and a nitrogen content of 0 to 1,000 ppm.

19. The secondary battery according to claim 16, wherein said nonaqueous solvent having a donor number of not more than 18 is at least one material selected from the group consisting of dimethyl carbonate, diethyl carbonate, propylene carbonate, γ-butyrolactone, acetonitrile, nitromethane, nitrobenzene, ethyl acetate, toluene, xylene, and methyl acetate.

20. The secondary battery according to claim 16, wherein said lithium salt is at least one material selected from the group consisting of lithium perchlorate ($LiClO_4$), lithium phosphate hexafluoride ($LiPF_6$), lithium borofluoride ($LiBF_4$), arsenolithium hexafluoride ($LiAsF_6$), lithium trifluoromethansulfonate ($LiCF_3SO_3$), and lithium bisfluoromethylsulfonylimide ($LiN(CF_3SO_2)_2$).

21. The secondary battery according to claim 16, wherein said lithium salt is dissolved within the range of 0.5 to 2.0 mols/l in said solvent mixture.

22. A method of manufacturing a carbonaceous material for a negative electrode of a battery, comprising the steps of:
carbonizing through a heat treatment at least one material selected from coke and one of fibrous and spherical carbon materials obtained from a pitch having anisotropy, thereby forming a carbon product;
pulverizing said carbon product into a carbon product powder; and
graphitizing said carbon product powder through a heat treatment at not less than 2,000° C.

23. The method according to claim 22, wherein said pitch having anisotropy contains not less than 95 vol % of an anisotropic pitch.

24. The method according to claim 22, wherein said fibrous material consists of short fibers having a length of 100 to 1,000 μm.

25. The method according to claim 22, wherein said carbon product has an interplanar distance $d_{002}$ of (002) planes, obtained by X-ray diffraction analysis, of 0.344 to 0.380 nm.

26. The method according to claim 22, wherein said carbon product has an orientation.

27. The method according to claim 22, wherein after being carbonized, said fibrous material is so pulverized as to be distributed at a ratio of not less than 90 vol % within the range of a length of 0.5 to 100 μm and have an average diameter of 1 to 30 μm.

28. The method according to claim 22, wherein the heat treatment in the carbonization step is performed at a temperature of 600° C. to 2,000° C.

29. The method according to claim 22, wherein the graphitization step is performed in an atmosphere containing chlorine gas.

30. The method according to claim 22, wherein said pitch having anisotropy is a mesophase pitch.

* * * * *

UNITED STATES PATENT AND TRADEMARK OFFICE
CERTIFICATE OF CORRECTION

PATENT NO. : 5,340,670
DATED : August 23, 1994
INVENTOR(S) : Norio TAKAMI et al.

It is certified that error appears in the above-indentified patent and that said Letters Patent is hereby corrected as shown below:

Claim 16, Column 52, Line 11, change "measure" to --measured--.

Signed and Sealed this

Eighteenth Day of April, 1995

Attest:

*Attesting Officer*

BRUCE LEHMAN

*Commissioner of Patents and Trademarks*